United States Patent [19]
Dickman et al.

[11] Patent Number: 6,091,409
[45] Date of Patent: *Jul. 18, 2000

[54] AUTOMATICALLY ACTIVATING A BROWSER WITH INTERNET SHORTCUTS ON THE DESKTOP

[75] Inventors: David R. Dickman, Redmond; Luis Fernando Talavera Abdala, Seattle; Kerry Schwartz, Seattle; James E. Allard, Seattle, all of Wash.

[73] Assignee: Microsoft Corporation, Redmond, Wash.

[*] Notice: This patent is subject to a terminal disclaimer.

[21] Appl. No.: 09/225,898

[22] Filed: Jan. 4, 1999

Related U.S. Application Data

[63] Continuation of application No. 08/526,314, Sep. 11, 1995, Pat. No. 5,877,765.

[51] Int. Cl.[7] .................................................. G06F 3/00
[52] U.S. Cl. ................................. 345/329; 345/349
[58] Field of Search .................................. 345/326–358

[56] References Cited

U.S. PATENT DOCUMENTS

| | | | |
|---|---|---|---|
| 5,021,976 | 6/1991 | Wexelblat et al. | 345/357 |
| 5,204,947 | 4/1993 | Bernstein et al. | 345/329 X |
| 5,261,044 | 11/1993 | Dev et al. | 345/329 |
| 5,452,416 | 9/1995 | Hilton et al. | 345/326 |
| 5,490,244 | 2/1996 | Isensee et al. | 345/349 |
| 5,500,929 | 3/1996 | Dickinson | 345/329 |
| 5,528,735 | 6/1996 | Strasnick et al. | 345/357 |
| 5,694,563 | 12/1997 | Belfiore et al. | 345/352 |
| 5,717,877 | 2/1998 | Orton et al. | 345/326 |

*Primary Examiner*—John E. Breene
*Attorney, Agent, or Firm*—Christensen O'Connor Johnson & Kindness PLLC

[57] ABSTRACT

A client computer has a facility for encapsulating location information, such as a uniform resource locator (URL), for a resource that is available on a server computer. The facility is especially well-adapted for use with Internet documents. The location information for such a resource is encapsulated into an object known as an Internet shortcut. The Internet shortcut may created through a drag and drop operation from a link to the desktop. Appearing as an icon, the shortcut is used to gain access to the underlying resource. The Internet shortcut icon holds a link to a remote resource and will automatically activate the web browser when selected. The Internet shortcut icons may be implemented as objects that are visible on the desktop of the operating system. File operations such as copy, delete, and copy may be performed on the Internet shortcut icon through a context menu. In addition, Internet shortcuts may be transferred to E-mail, facsimile, floppy disk destinations through a context menu.

29 Claims, 32 Drawing Sheets

|        | BOOKMARKS |      |         |        |
|--------|------|------|---------|-----------|
| NAME   | SIZE | DATE | MACHINE | PATH      |
| 📁 MUSIC | ----- | ----- | ftp.eup.edu | pub/music/ |
| 📁 NCSA  | ----- | ----- | ftp.nosa.edu | mac/ |

*Figure 1C*

(PRIOR ART)

AUTOMATICALLY ACTIVATING A BROWSER WITH INTERNET SHORTCUTS ON THE DESKTOP

RELATED APPLICATIONS

This application is a continuation application under 37 C.F.R. § 1.53(b) claiming priority from U.S. patent application Ser. No. 08/526,314, which is a Continued Prosecution Application under 37 C.F.R. § 1.53(d) that was filed on Feb. 12, 1998, and which claimed the priority filing date of the parent U.S. patent application Ser. No. 08/526,314, which was filed on Sep. 11, 1995, now U.S. Pat. No. 5,877,765.

FIELD OF THE INVENTION

The present invention relates generally to computer systems and more particularly to locating resources on the Internet.

BACKGROUND OF THE INVENTION

One of the difficulties that users of the Internet have encountered is the difficulty in locating and identifying resources within the Internet. In order to help standardize the location and identification information for Internet resources, the notion of a uniform resource locator (URL) has been developed. A URL is a string that describes the location of a resource on the Internet. A URL may include a number of different components, including the identification of a scheme (i.e., Internet protocol) and a path name. A URL may be utilized by an Internet protocol handler to locate the resource that is identified by the URL.

Navigation tools have been developed to assist users in navigating the Internet. These navigation tools include Web browsers that are used to browse the World Wide Web portion of the Internet. The Web browsers have provided a number of mechanisms for assisting a user in quickly locating documents on the Internet. FIG. 1A depicts an example of one mechanism that is employed within a window 10 of a Web browser. The mechanism is a text box 12 in which a user may enter a URL. After the user enters the URL, the corresponding document is retrieved and displayed.

Another mechanism that has been employed in Web browsers is a list, such as a hot list or a history list. FIG. 1B depicts an example of a hot list. A hot list contains a list of the user's favorite document sites. In this regard, the hot list acts as a sort of cache of documents from the Internet. In FIG. 1B, the hot list has its own window 14 that includes a list portion 18 and buttons 20. The buttons 20 may be used to add or delete items from the list 18. To view a particular document on the hot list, the user selects the item from the hot list and requests that the item be opened by double clicking on the item or using another opening mechanism. History lists are similar to hot lists, but maintain a historical list of Web sites that have been visited by a user.

Certain Web browsers utilize bookmarks. A bookmark is a pointer to an Internet site. A user may create a number of bookmarks that are stored in a list like that shown in FIG. 1C. The list 22 has separate entries 24 and 26 for each of the bookmarks the user has saved.

SUMMARY OF THE INVENTION

The present invention provides an improved ability to locate resources in a distributed environment, such as the Internet. In accordance with a first aspect of the present invention, a method is practiced in a client computer system that runs an operating system. The operating system provides a name space of objects that are visible to a user. The client computer system is coupled to a network that has a server for providing an Internet resource. The Internet resource has an associated uniform resource locator (URL). Per the method of this aspect of the present invention, the URL for the resource is encapsulated into a selected object. The selected object is stored on the client computer system so that it is visible in the name space.

In accordance with another aspect of the present invention, a client computer system has a storage and a name space of objects that are visible to a user. The client computer system is coupled to a network that is a server for providing a resource to the client computer system. The resource has associated location information that the client computer system may use to locate the resource. The location information for the resource is encapsulated into a selected object. The selected object is stored in the storage of the client computer system such that the selected object is visible in the name space of the client computer system In accordance with a further aspect of the present invention, a resource is provided on a server computer that is part of a distributed system. The resource on the server computer is provided for access by the client computer. Location information is associated with the resource to enable the client computer to locate the resource. An application is run on the client computer for locating and accessing the resource on the server computer. The application has a window that is associated with it. The location information for the resource is encapsulated into an object. A visual representation of the object is displayed on a video display at a location that lies outside of the window of the application. The visual representation facilitates access to the resource.

In accordance with an additional aspect of the present invention, a selected object is provided that encapsulates location information for a remote resource at a server computer. The location information enables the remote resource to be located by a client computer. A visual representation of the selected object that encapsulates the location information for the remote resource is provided at the first location on an output device. A user uses the input device and, in response, the visual representation of the selected object is dragged to a target location on the output device that is associated with the target object. The visual representation is dropped at the target location. In response, a copy of the selected object is embedded in the target object.

In accordance with yet another aspect of the present invention, location information for locating a first resource on a server in a network is encapsulated into the first object. The first object is visible in a name space of a client computer system. Location information for locating a second resource on one of the servers in the network is encapsulated into a second object that is visible in the name space of the client computer system. A user makes a request and, in response, the first object or the second object is used to access the location information therein. and thus access the first or second resource.

In accordance with an additional aspect of the present invention, a client computer system is coupled to a server computer that has a resource for access by the client computer system. The resource has location information for enabling location of the document by the client computer system. The client computer system includes a storage device for storing objects, and an operating system for providing a name space of the objects. The client computer system also includes a module for encapsulating the location information of the resource into a selected object that is visible in the name space. The client computer system further includes an access module for using the location information encapsulated into the selected object to locate and access the resource on behalf of the client computer system.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1C illustrates a list of bookmarks that are used to locate documents in a conventional system;

DETAILED DESCRIPTION OF THE PREFERRED EMBODIMENT

The preferred embodiment of the present invention provides a facility for creating Internet shortcuts. Internet shortcuts are like other shortcuts found in the "Microsoft Windows 95" operating system, sold by "Microsoft" Corporation of Redmond, Wash. except that they point to resources (such as documents or services) that reside on the Internet. Each Internet shortcut appears to the user as a shortcut icon. The user may double click on the Internet shortcut icon to access the associated Internet resource. As Internet shortcuts are objects that comply with the "Microsoft" OLE 2.0 component object model, they exhibit the behavior associated with such types of objects. For example, as will be explained in more detail below, the Internet shortcuts may be dragged and dropped. The Internet shortcuts encapsulate URLs (or other location information) and other information. The Internet shortcuts are implemented as objects that are visible within the shell name space.

The preferred embodiment of the present invention provides a user with the ability to manipulate Internet resources in a well understood environment (i.e., the environment of the operating system's shell). The Internet shortcuts eliminate the need for the user to know the physical location of the resource that the user wishes to access. In other words, the Internet shortcuts provide a layer of abstraction that hides the physical location from the user. Moreover, the Internet shortcuts provide a consistent approach to accessing Internet resources across different Internet protocols.

Figure 1A:
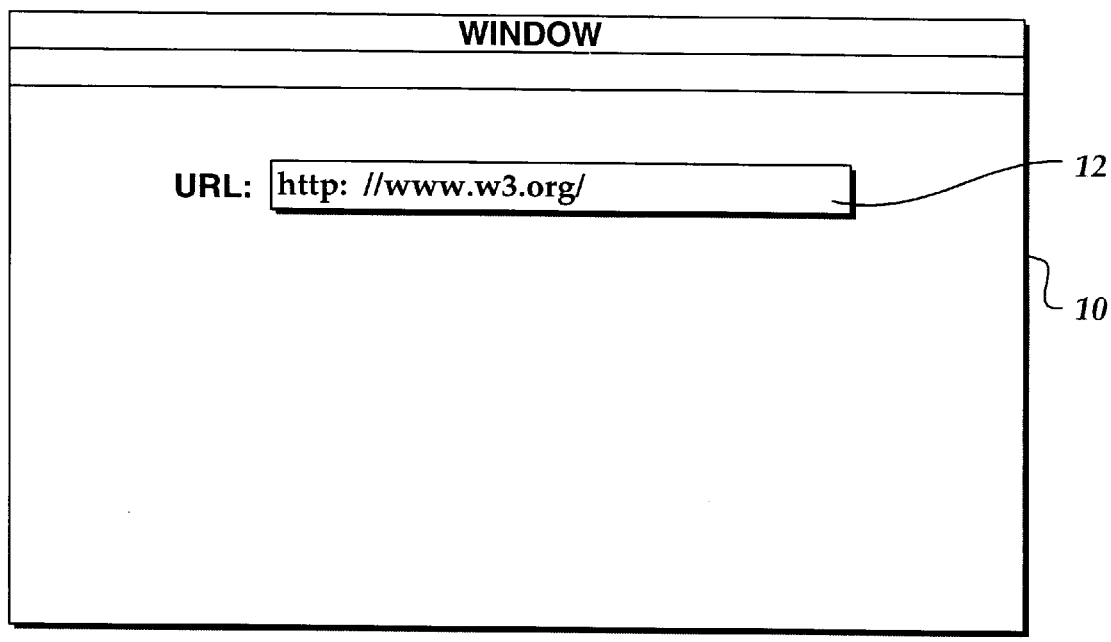
FIG. 1A depicts an example of a text box that is used to locate documents in a conventional system.
Figure 1B:
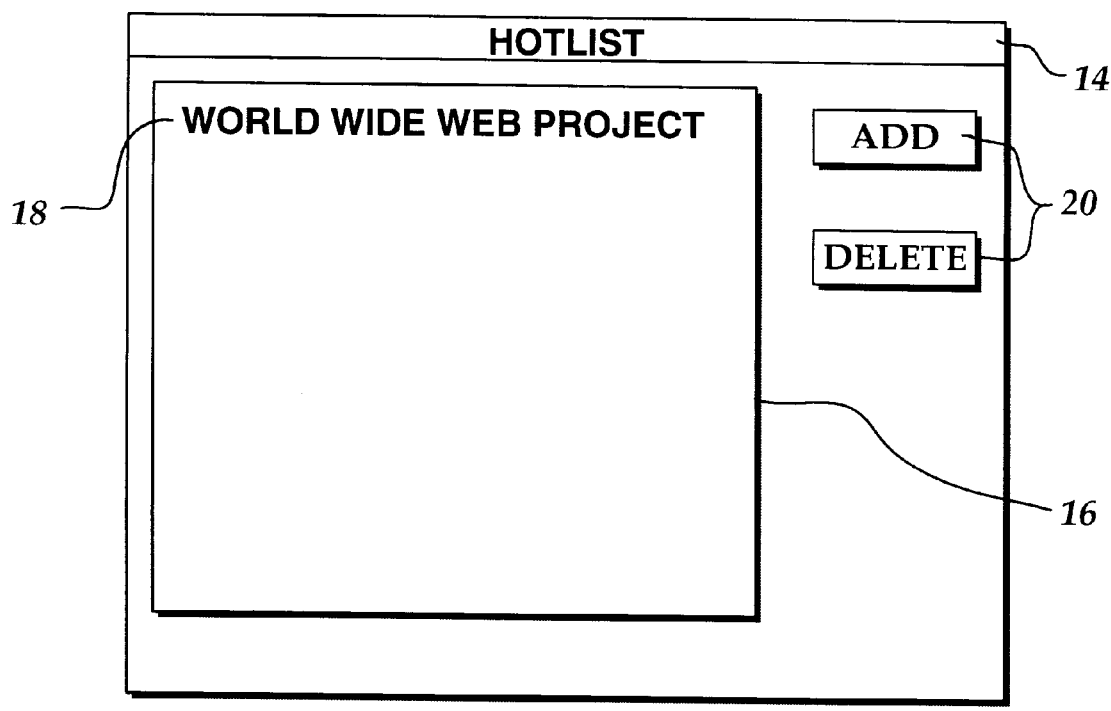
FIG. 1B shows an example of a hot list that is used to locate documents in a conventional system.
Figure 2:
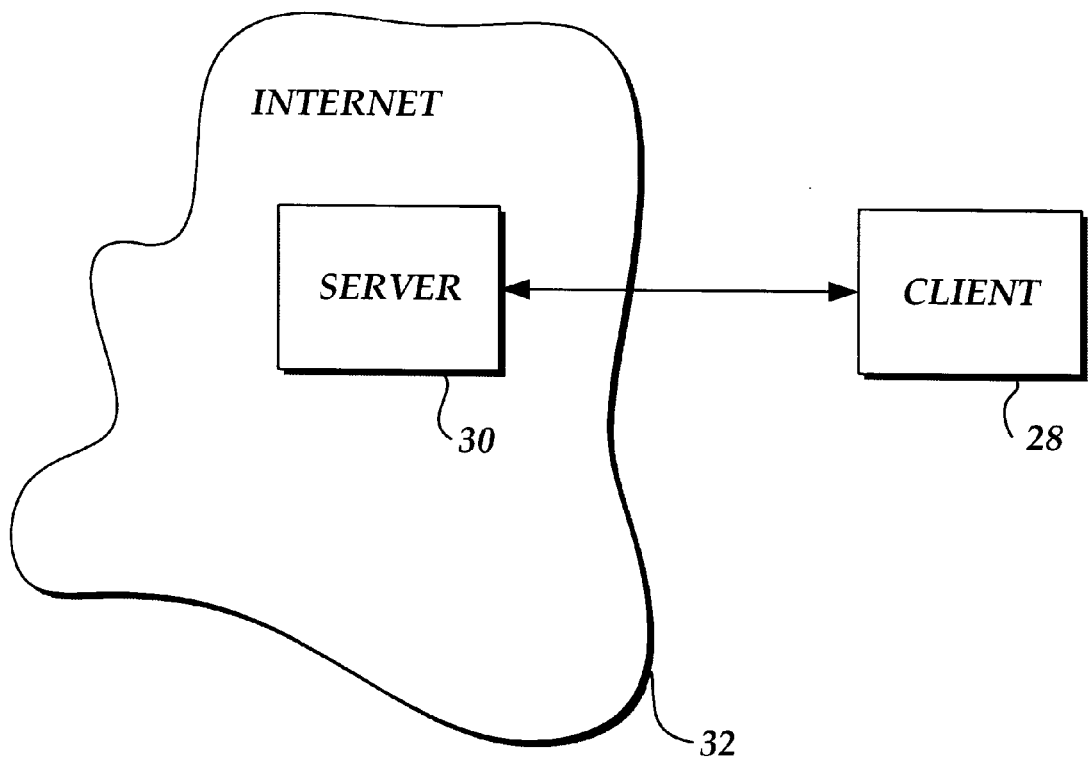
FIG. 2 is a block diagram illustrating an environment in which the preferred embodiment of the present invention may be practiced.

FIG. 2 is a block diagram that depicts the environment that is of interest to the preferred embodiment of the present invention. In particular, the preferred embodiment of the present invention is concerned with the situation where a client computer 28 wishes to connect to a server computer 30 that is part of an Internet 32. The client computer 28 wishes to access a resource that is on the server 30.

Figure 3:
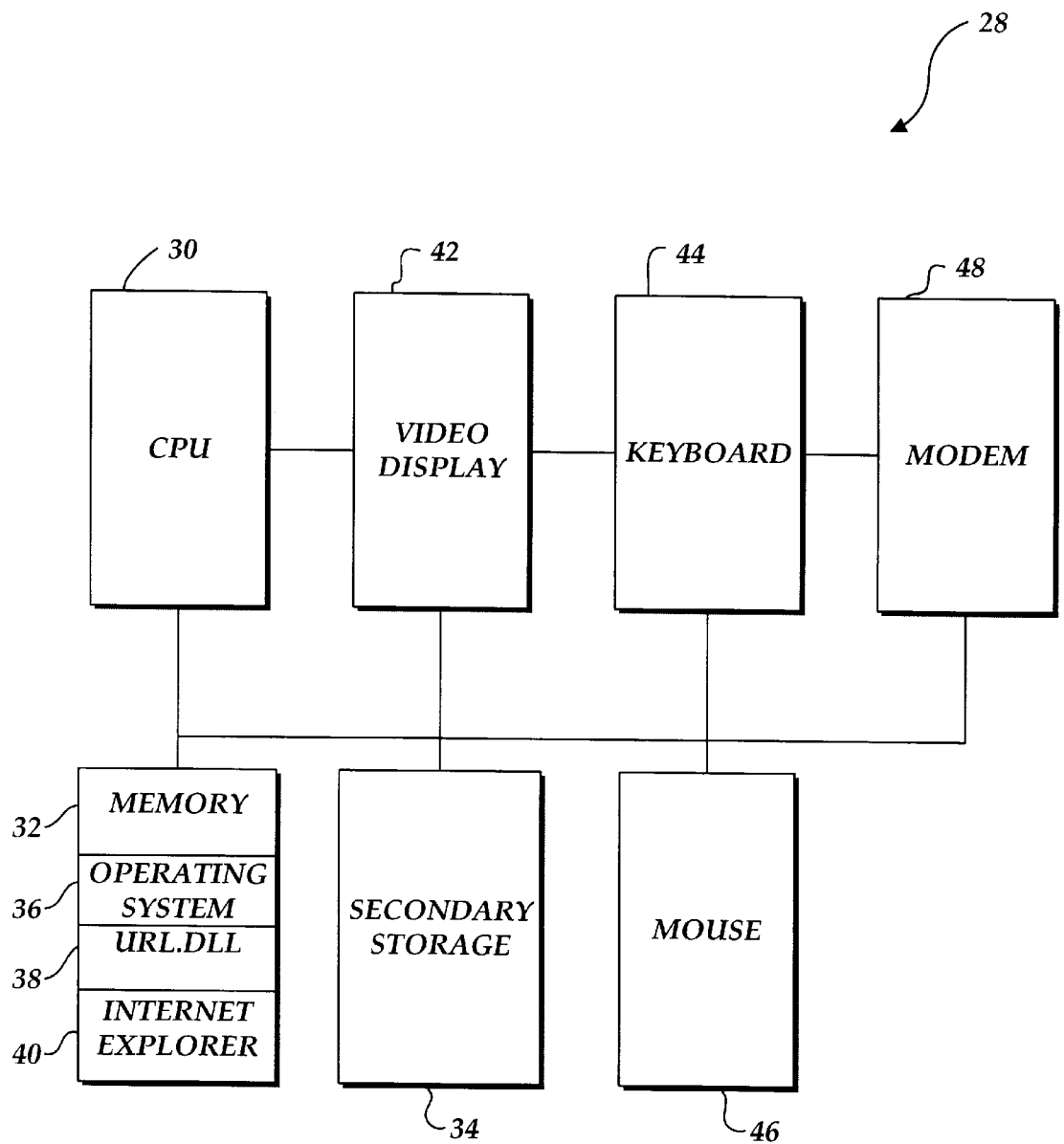
FIG. 3 is a block diagram showing the client computer system of FIG. 2 in more detail.

FIG. 3 is a block diagram that shows in more detail a suitable client computer configuration for practicing the preferred embodiment of the present invention. The client computer 28 includes a central processing unit (CPU) 30 that has access to a primary memory 32 and a secondary storage 34. The primary memory 32 holds a copy of an operating system 36. For purposes of the discussion below, it is assumed that the operating system 36 is the "Microsoft Windows 95" operating system. The primary memory 32 also holds a copy of URL.DLL 38, which is the Internet shortcut shell extension handler that provides the facilities for implementing the Internet shortcuts in the preferred embodiment of the present invention. Although the Internet shortcut handler 38 is shown in FIG. 3 as being separate from the operating system 36, those skilled in the art will appreciate that it may in alternative embodiments be incorporated as part of the operating system. An "Internet Explorer" 40 is also held within the memory 32. The "Internet Explorer" 40 enables a user to explore the Internet and view documents from the Internet. The "Internet Explorer" 40 may include client programs for protocol handlers for different Internet protocols (e.g., HTTP, FTP and Gopher) to facilitate browsing using different protocols. The client computer 28 also has a number of input/output devices. These input/output devices include a video display 42, a keyboard 44, a mouse 46, and a modem 48.

As mentioned above, an Internet shortcut extension handler is provided in the preferred embodiment of the present invention. The Internet shortcut extension handler is an example of a shell extension handler. Shell extension handlers are described in more detail in copending application, "Shell Extensions for an Operating System," U.S. patent application Ser. No. 08/355,410, which was filed on Dec. 13, 1994, now U.S. Pat. No. 5,831,606 and which is explicitly incorporated by reference herein. The Internet shortcut extension handler is registered within a registry that is maintained by the operating system 36 of the client computer 28. The registration of the Internet shortcut extension handler within the registry helps the client computer to be aware of the handler and to utilize it when needed. All Internet shortcuts are implemented in the preferred embodiment as files that contain the .url filename extension. The Internet shortcut extension handler serves as a class handler for files of the .url class. The Internet shortcut extension handler contains support for creating, opening and displaying Internet shortcuts and other additional operations that may be performed relative to Internet shortcuts.

The registry is implemented as a hierarchically structured tree having a number of nodes. Each node is identified by a keyname composed of ANSI characters. Keys may contain other keys, known as subkeys. The registry has a predefined key called HKEY_CLASSES_ROOT. At the same level of the hierarchy are other predefined keys including: HKEY_CURRENT_USER, HKEY_LOCAL_MACHINE, HKEY_USERS, HKEY_CURRENT_CONFIG, HKEY_PERFORMANCE_DATA and HKEY_DYN_DATA. Each of these predefined keys acts as a root of a separate subtree in the registry.

Before an application program may add data to the registry, the application program must open a key within the registry. To open a key within the registry, the application program must supply the handle of another key in the registry that is already open. The predefined keys listed above serve as entry points to the registry for application programs. Of particular interest to the preferred embodiment of the present invention is the HKEY_CLASSES_ROOT key. Registry entries that are subordinate to this key define types or classes of documents and properties associated with such types or classes.

Client programs for protocol handlers for the respective protocols are also registered in the registry. The registry entries for the protocol handlers are stored under the HKEY_CLASSES_ROOT subkey. For each protocol, there is a definition of the name of the protocol, the open command that is used for the protocol, and the icon to be used for the protocol. An example of such a portion of the registry for the http and ftp protocols is:

```
HKEY_CLASSES_ROOT
    ftp
        <Default> REG_SZ"URL:File Transfer Protocol"
        EditFlags REG_BINARY 0x00000002
        URL Protocol REG SZ:""
        DefaultIcon
            <Default> REG_SZ "c:\windows\ftp.exe,0"
        shell
            open
                command REG_SZ "c:\windows\ftp.exe"
                ddeexec REG_SZ "[%1]"
                    Application
                        <Default> REG_SZ "FTP"
                    Topic
                        <Default>    REG_SZ    "FTP-
                        OpenURL"
    htp
        <Default> REG_SZ "URL:HyperText Transfer Protocol"
        EditFlags REG_BINARY 0x00000002
        URL Protocol REG_SZ:""
        DefaultIcon
            <Default> REG_SZ "c:\ncsa\mosaic.exe,0"
        shell
            open
                command REG_SZ "c:\ncsa\mosaic.exe"
                ddeexec REG_SZ "[%1]"
                    Application
                        <Default> REG_SZ "Mosaic"
                    Topic
                        <Default>    REG_SZ    "WWW-
                        OpenURL"
```

Note that different protocols may employ different default icons.

Figure 4:
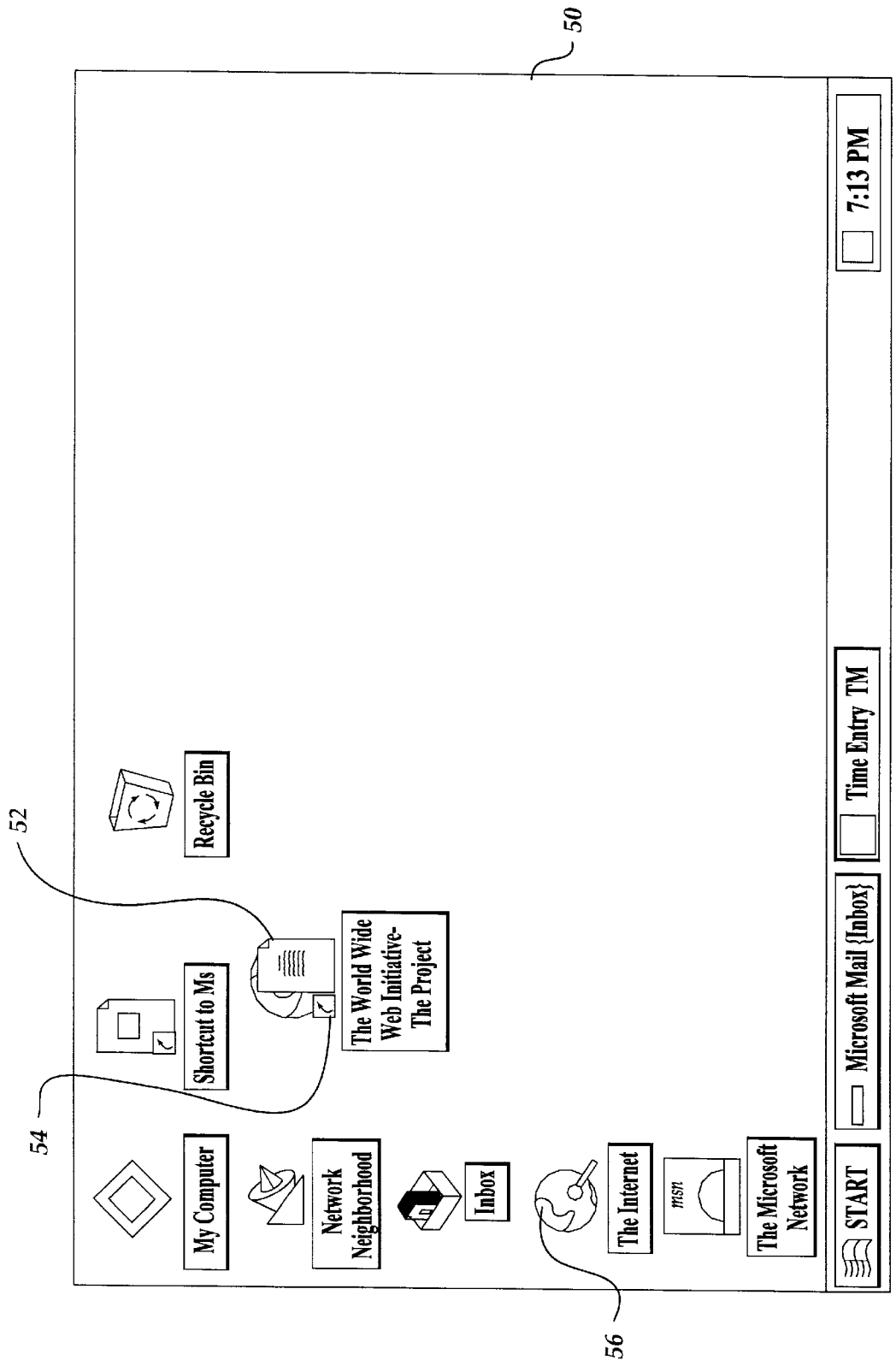
FIG. 4 is an example of a user interface that shows an Internet shortcut in accordance with the preferred embodiment of the present invention.

In order to gain a fuller understanding of Internet shortcuts, it is helpful to review how Internet shortcuts appear and how they are used by a user. FIG. 4 shows an example of the visual appearance of an Internet shortcut 52 on a virtual desktop 50 that is produced by the operating system 36. The Internet shortcut 52 is displayed on the virtual desktop 50 as an icon with a distinguishing arrow portion 54 drawn in its lower left-hand corner to denote that the icon refers to a shortcut. The name of the Internet shortcut 52 is displayed beneath the icon. The virtual desktop 50 also displays an icon 56 for the "Internet Explorer" 40.

Figure 5:
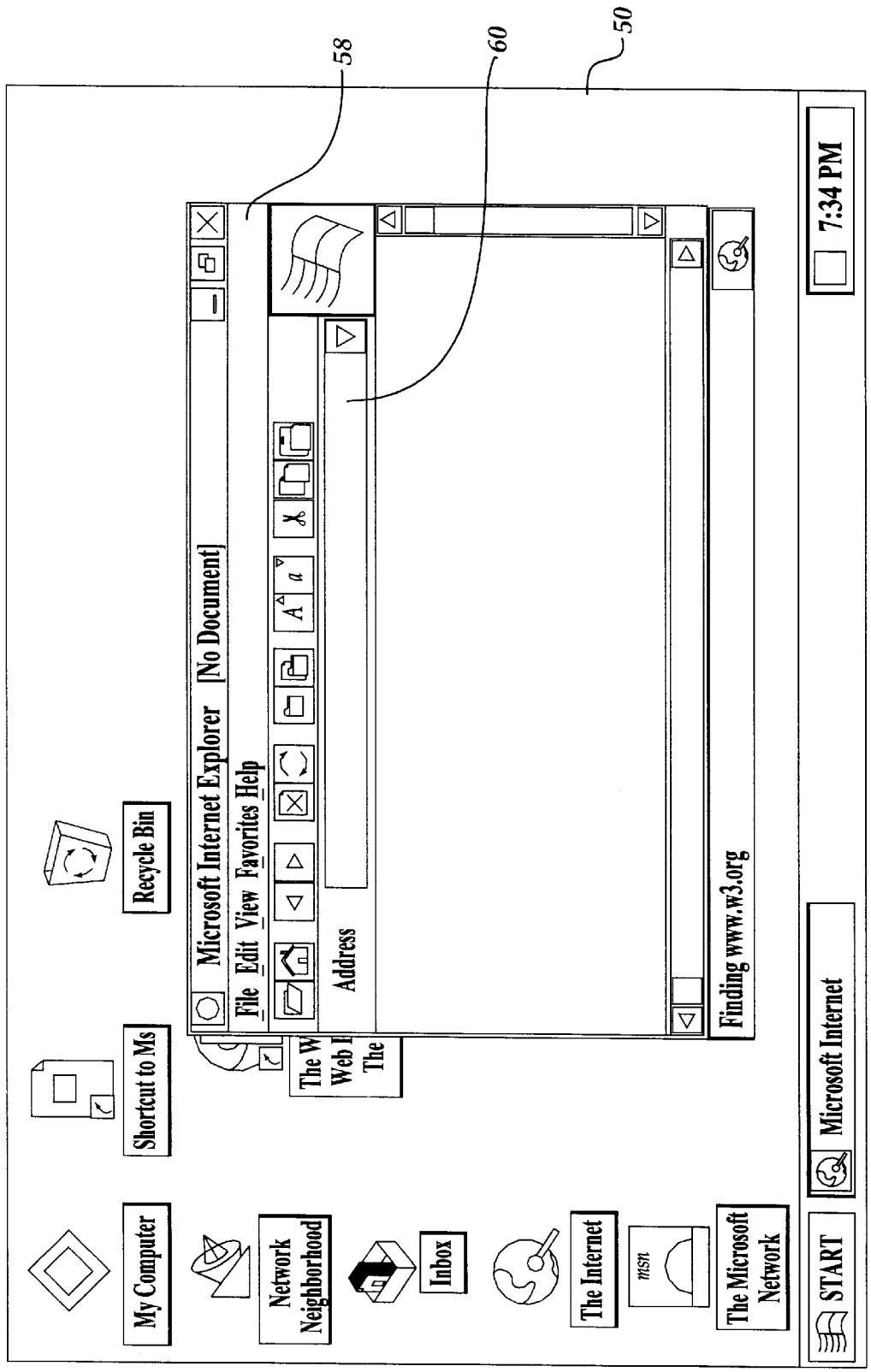
FIG. 5 is an example of an "Internet Explorer" window that may be used in the preferred embodiment of the present invention.
Figure 6:
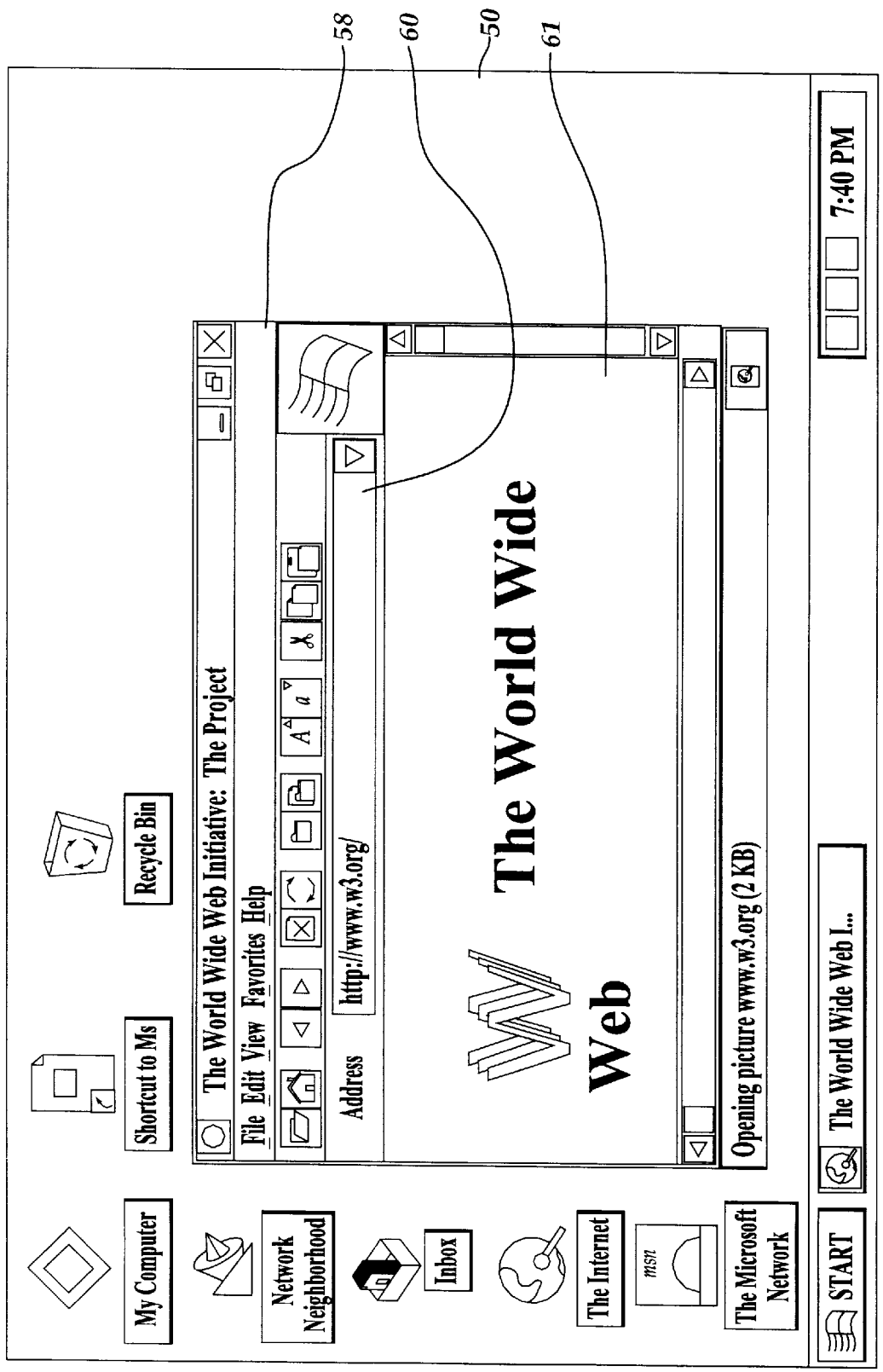
FIG. 6 is an example of an open Internet document being displayed within the "Internet Explorer" window.
Figure 7:
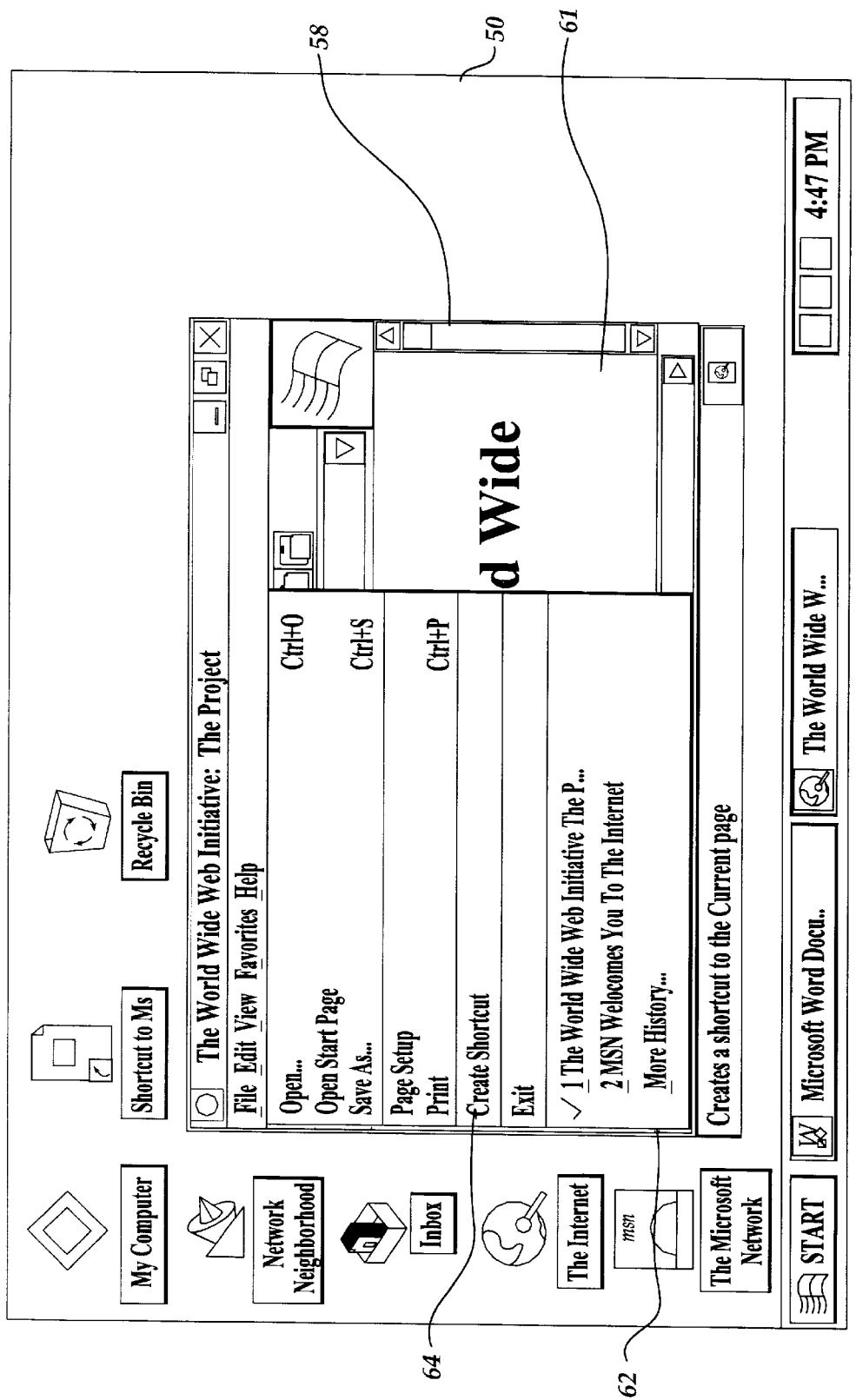
FIG. 7 illustrates a file menu that may be accessed from the "Internet Explorer" window.
Figure 8:
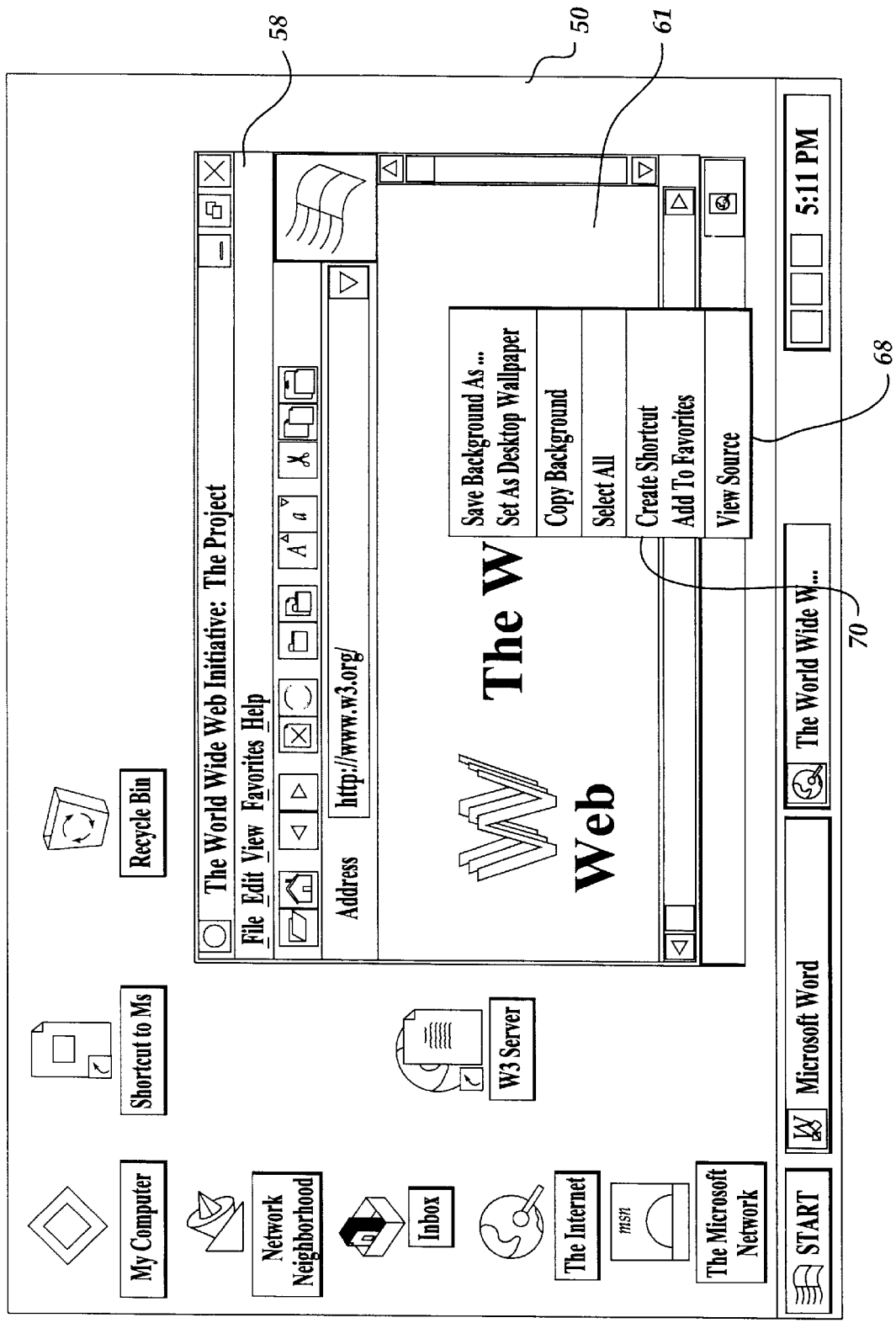
FIG. 8 illustrates a context menu that may be accessed for an Internet document.

A user has a number of options for creating an Internet shortcut. The discussion below will first focus on the user interface components for creating Internet shortcuts and then focus on the programmatic steps that are taken to create Internet shortcuts. One way in which a user may create an Internet shortcut is to position a mouse cursor over the "Internet Explorer" icon 56 and double click a designated button on the mouse 46 in order to open the "Internet Explorer". The "Internet Explorer" 40 initially appears to the user as shown in FIG. 5. Specifically, a window 58 for the "Internet Explorer" is shown on the virtual desktop 50. The window 58 includes a text box 60 that may be used to enter a URL for a document that is to be opened. Suppose that the user enters the URL "http:\\www.w3.org" in the text box 60, as shown in FIG. 6. If the user then requests to open the document associated with the URL in the text box 60, a document 61 is displayed within the client area of the "Internet Explorer" window 58.

Once the Internet document is displayed within the client area of the "Internet Explorer" window 58, the user has a number of options for creating a shortcut to the document. First, the user may open a file menu 62 that includes a "Create Shortcut" menu option 64 which when selected causes a shortcut for the active Internet document to be created on the virtual desktop 50. Another option to create a shortcut is for the user to click a right button on the mouse 46 to cause a context menu 68 to be displayed for the Internet document. The context menu 68 includes a menu option 70 for creating a shortcut.

Figure 9A:
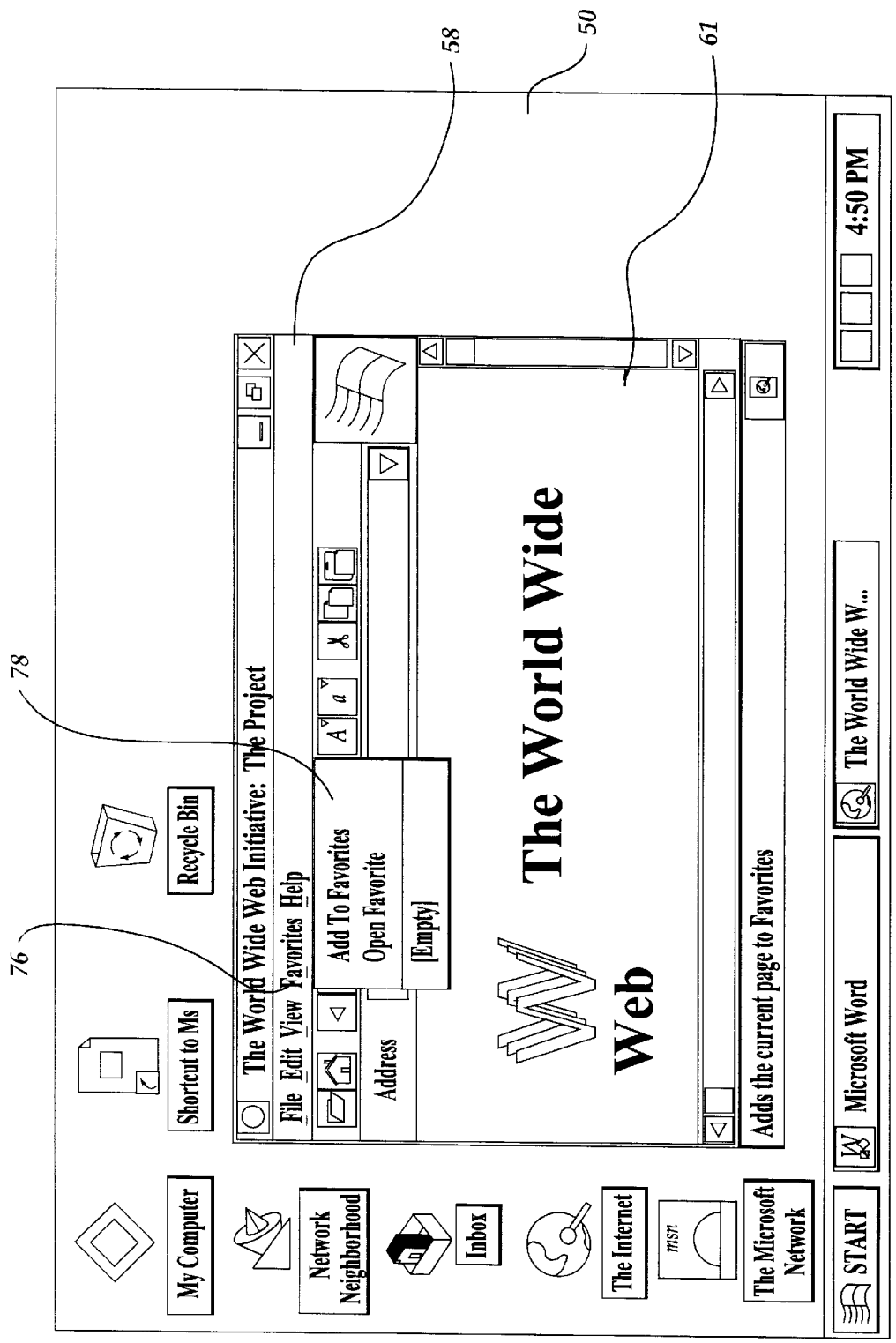
FIG. 9A illustrates a "Favorites" menu that is available in the "Internet Explorer"
Figure 9B:
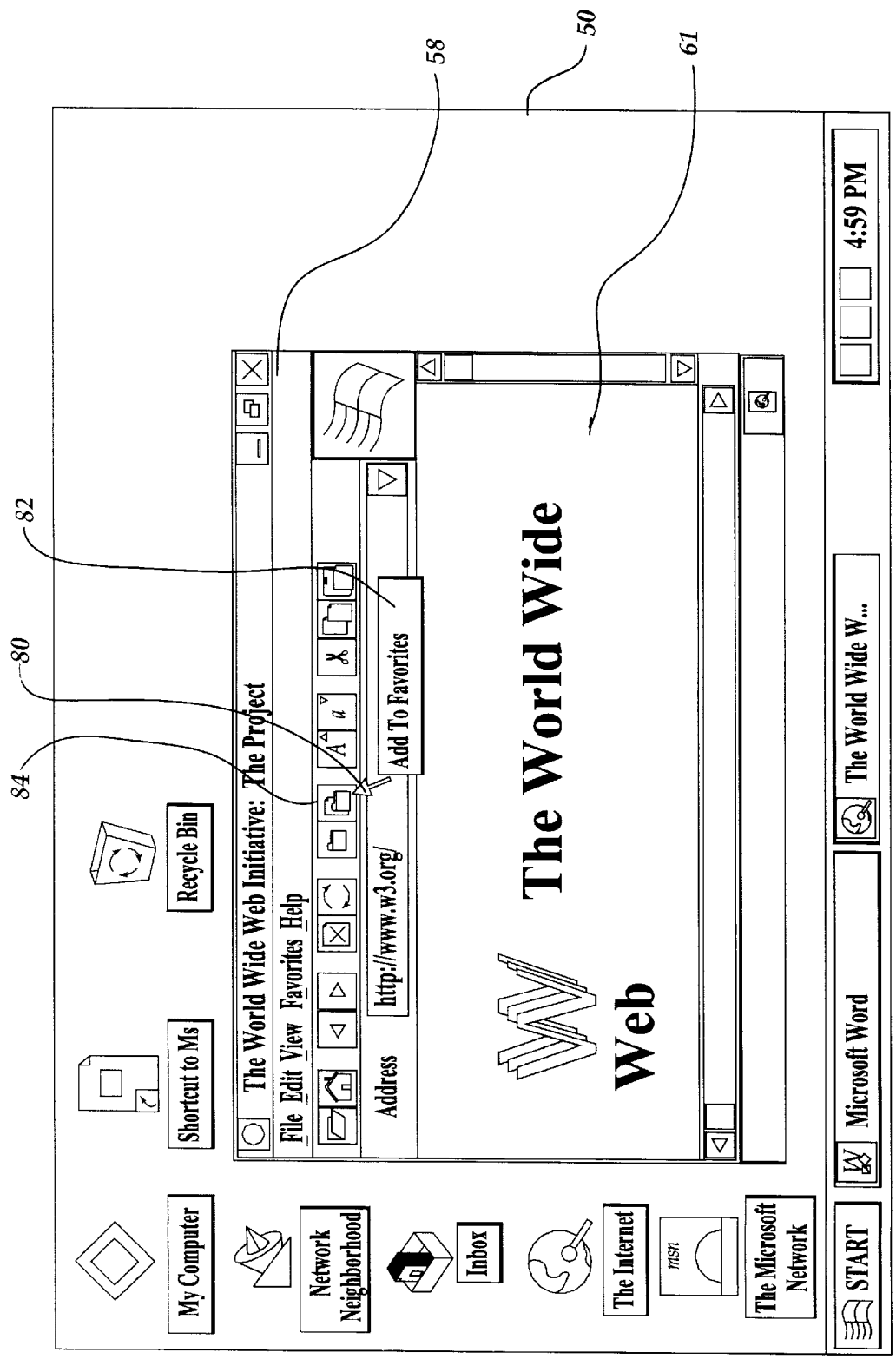
FIG. 9B illustrates a "Add To Favorites . . . " button that is available in the "Internet Explorer"
Figure 9C:
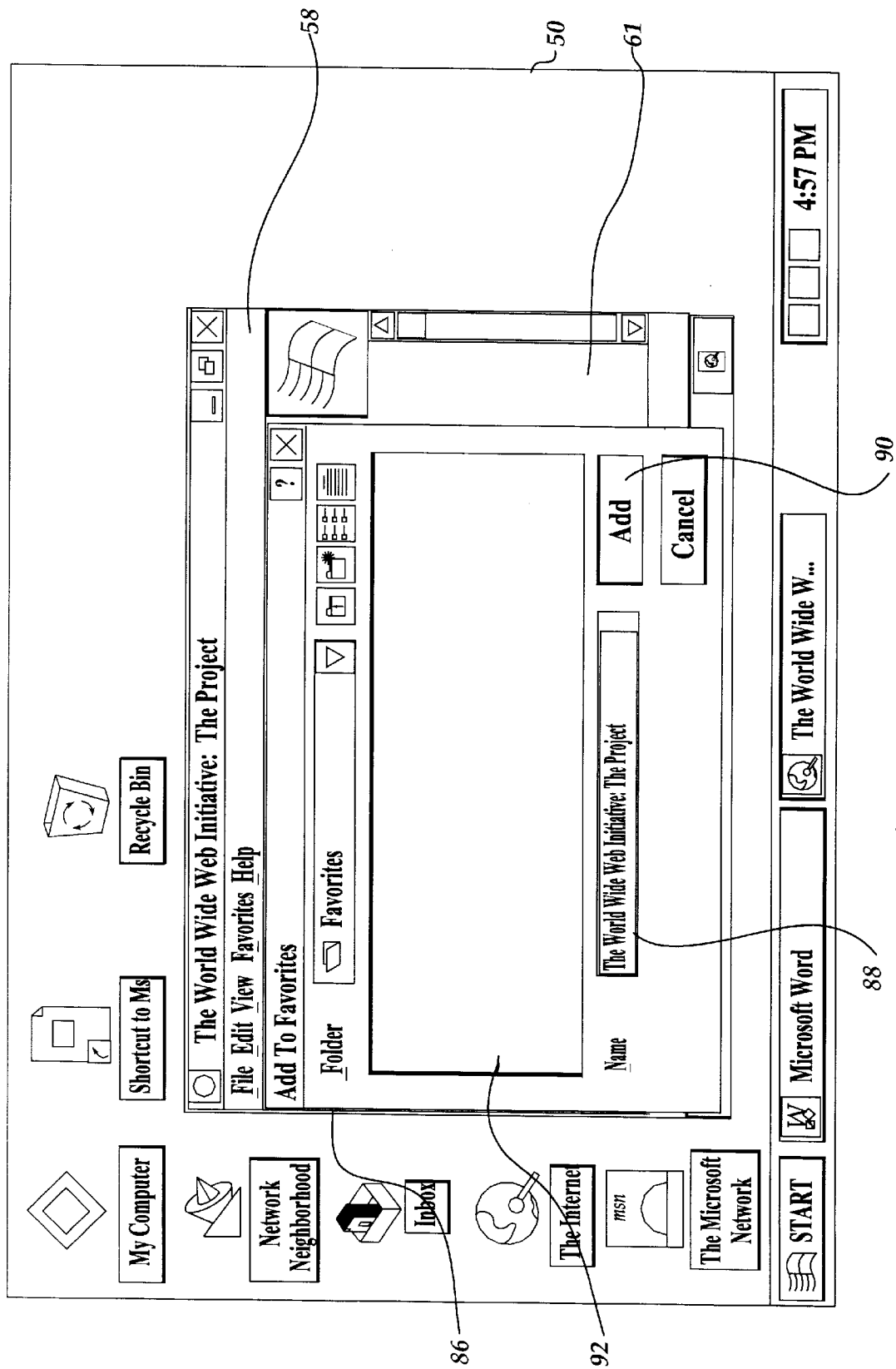
FIG. 9C illustrates a dialog that is provided in the preferred embodiment of the present invention for adding Internet shortcuts to a "Favorites" folder.
Figure 9D:
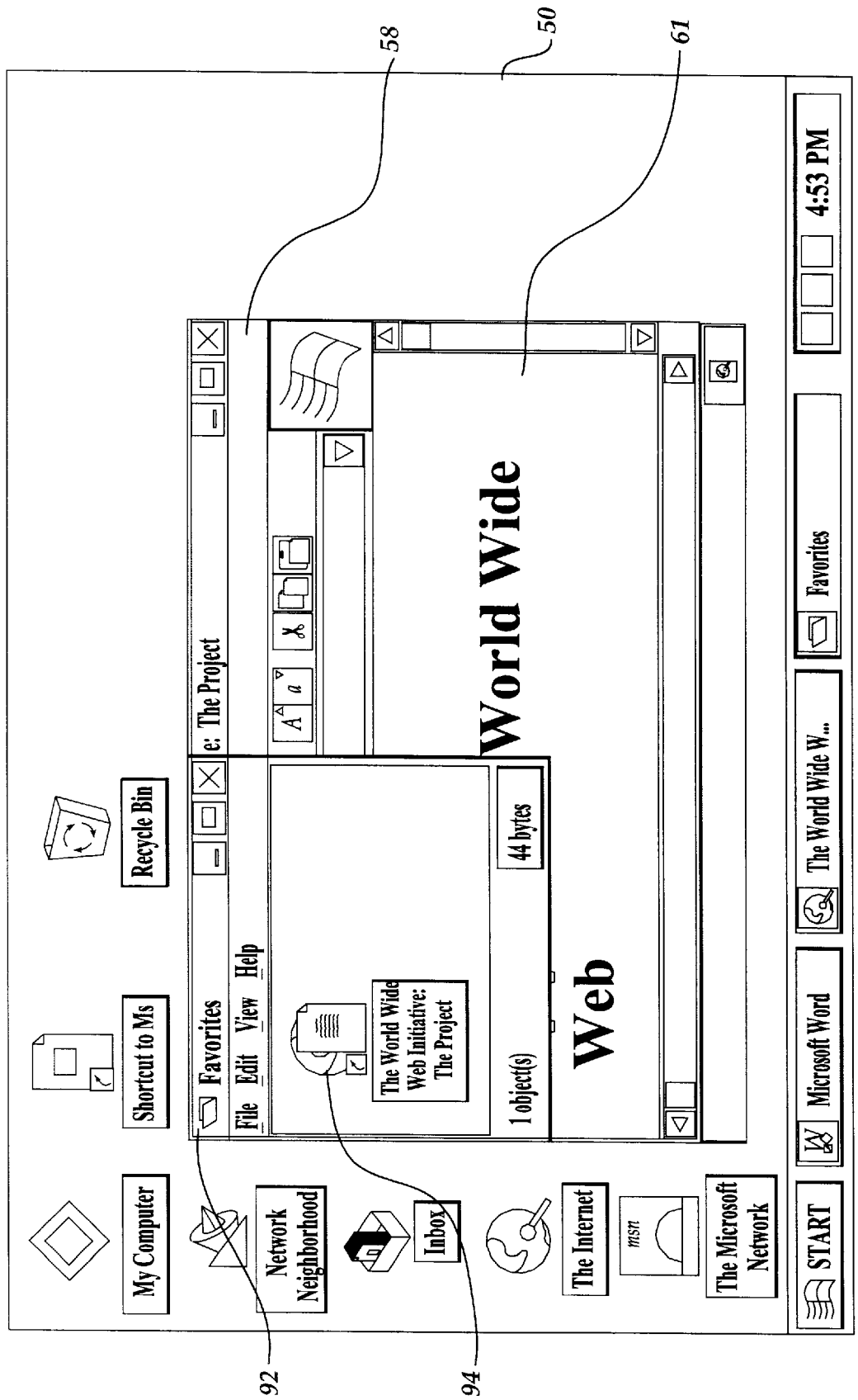
FIG. 9D illustrates an Internet shortcut that resides within the "Favorites" folder.

The preferred embodiment of the present invention also provides a "Favorites" folder which may be used to hold Internet shortcuts to favorite Internet sites of a user. A "Favorites" menu item 76 (FIG. 9A) is provided on menu bar of the "Internet Explorer" window 58. When the "Favorites" menu is opened, an "Add To Favorites . . . " menu option 78 is provided. The selection of this menu option causes the shortcut to the current page to be added to the "Favorites" folder. An "Add To Favorites . . . " button 84 is provided on the toolbar of the "Internet Explorer" window 58 (FIG. 9B). A user may add an Internet shortcut to the "Favorites" folder by positioning a mouse cursor 80 over the button 84 and activating the button. The button has an associated tool tip 82 that may be displayed when the mouse cursor is positioned over it for a sufficient amount of time. When a user selects the "Add To Favorites . . . " menu option 78 or activates the "Add To Favorites . . . " button 84, an "Add To Favorites . . . " dialog 86 (FIG. 9C) is displayed. A list 92 lists the Internet shortcuts that are currently in the "Favorites" folder. The name of the page for which an Internet shortcut is to be added is listed in a Name text box 88. The user has the option of creating a different name for the Internet shortcut. When a user wishes to add an Internet shortcut for the current page to the "Favorites . . . " folder, the user activates the "Add" button 90. As a result, an Internet shortcut 94 (FIG. 9D) is visible in the window for the "Favorites" folder 92.

Each Internet shortcut is implemented as an object that supports a number of "Microsoft" OLE 2.01 interfaces. In particular, each Internet shortcut supports the following standard OLE interfaces: IDataObject, IPersist, IPersistFile, IPersistStream, and IUnknown. In addition, each Internet shortcut supports the following shell extension OLE interfaces: IExtractIcon, IShellExtInit, IShellLink, and IShellPropSheetExt interfaces. These shell extension interfaces are described in more detail in the copending application entitled "Shell Extensions for an Operating System," U.S. patent application Ser. No. 08/355,410. In addition, each Internet shortcut object must support the IUniformResourceLocator interface. This interface includes three methods. The first method is the Get method for retrieving a URL from the Internet shortcut object. The second method is the Set method for setting a URL for an Internet shortcut object. Lastly, an Invoke method is provided for invoking a command on the Internet shortcut object.

Figure 10:
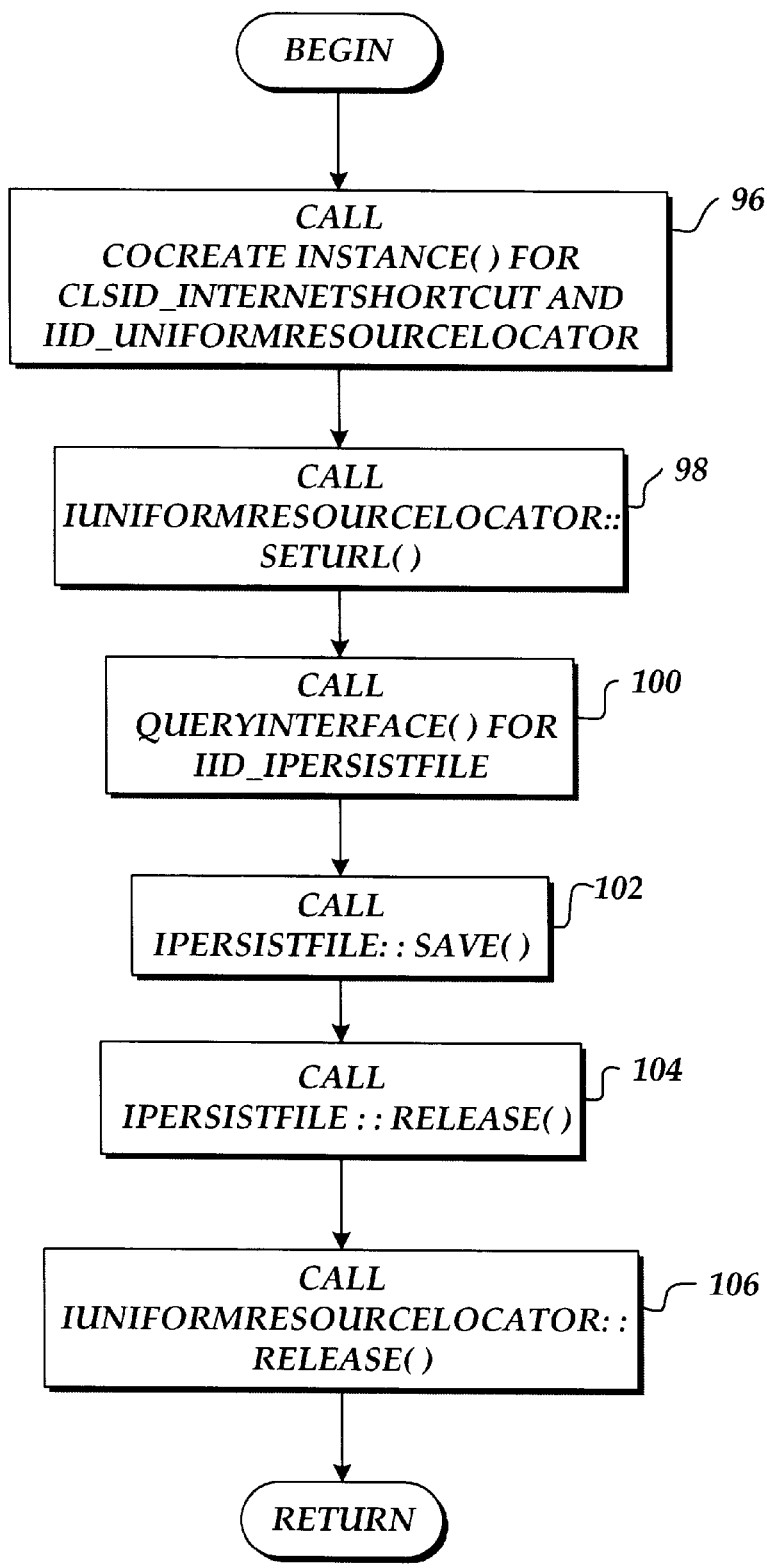
FIG. 10 is a flowchart of the programmatic steps that are performed to create an Internet shortcut when the approaches of FIGS. 7–9D are used.

The four above-described approaches for creating an Internet shortcut (described relative to FIGS. 7–9D) require the same programmatic steps to be performed. FIG. 10 is a flowchart illustrating the programmatic steps that are performed to create an Internet shortcut in such an instance. First, the predefined function CoCreateInstance(is called to create an object of the Internet shortcut object class and to obtain an IUniformResourceLocator interface for the created Internet shortcut object (step 96 in FIG. 10). The SetURL( ) function within the IUniformResourceLocator interface of the Internet shortcut object is called to set the URL value for the Internet shortcut object (step 98). A QueryInterface( ) function is called to obtain an IPersistFile interface that is supported by the Internet shortcut object (step 100). The Save( ) fuinction of the IPersistFile interface is called to save the Internet shortcut as a .url file in the file system of the operating system 36 (step 102). The Release( ) fuinction of the IPersistFile interface is then called to release the interface (step 104). Lastly, the Release( ) function of the IUniformResourceLocator interface is called to release that interface (step 106).

Figure 11A:
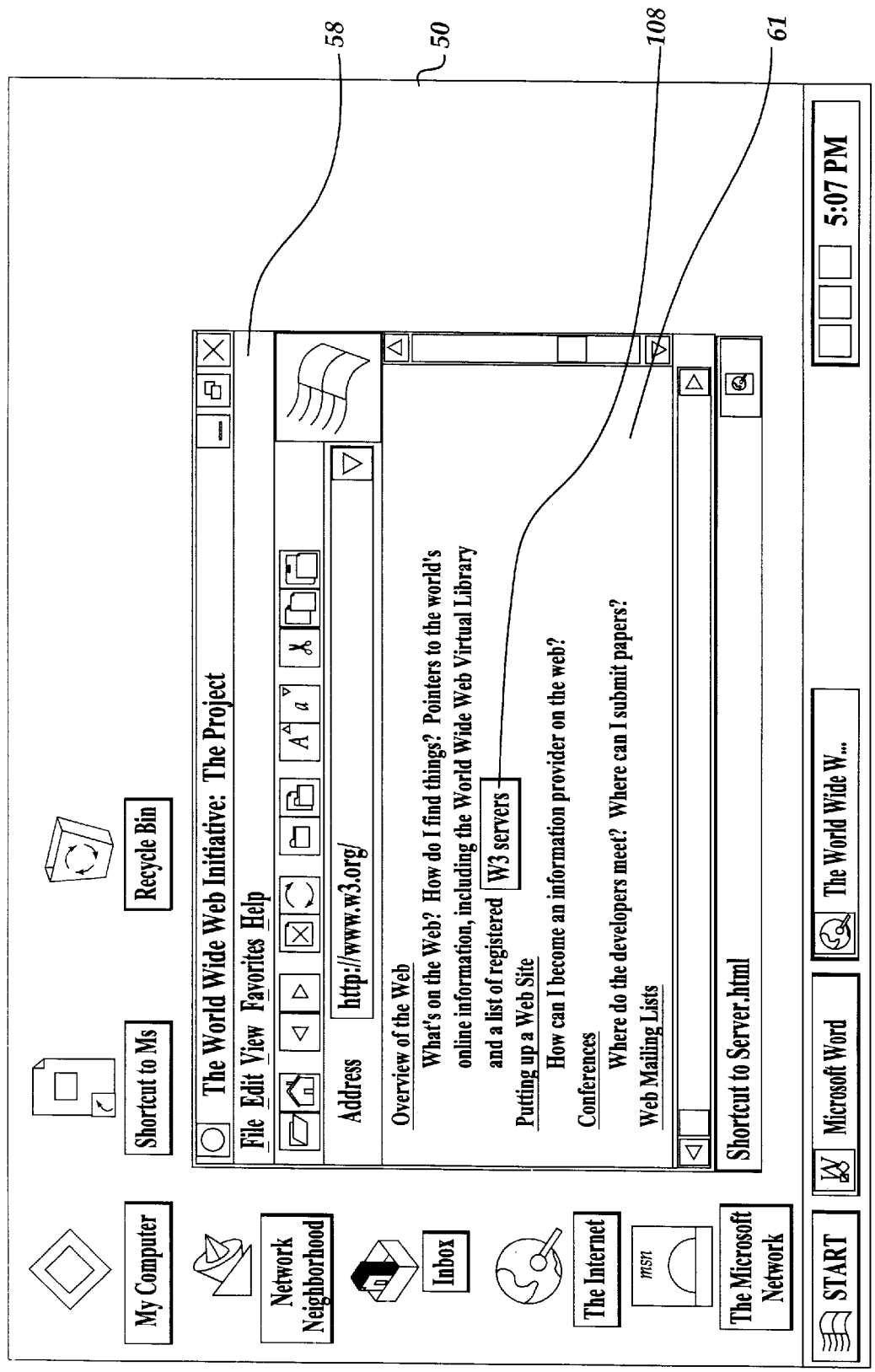
FIG. 11A illustrates a portion of an Internet document that includes a hypertext link.
Figure 11B:
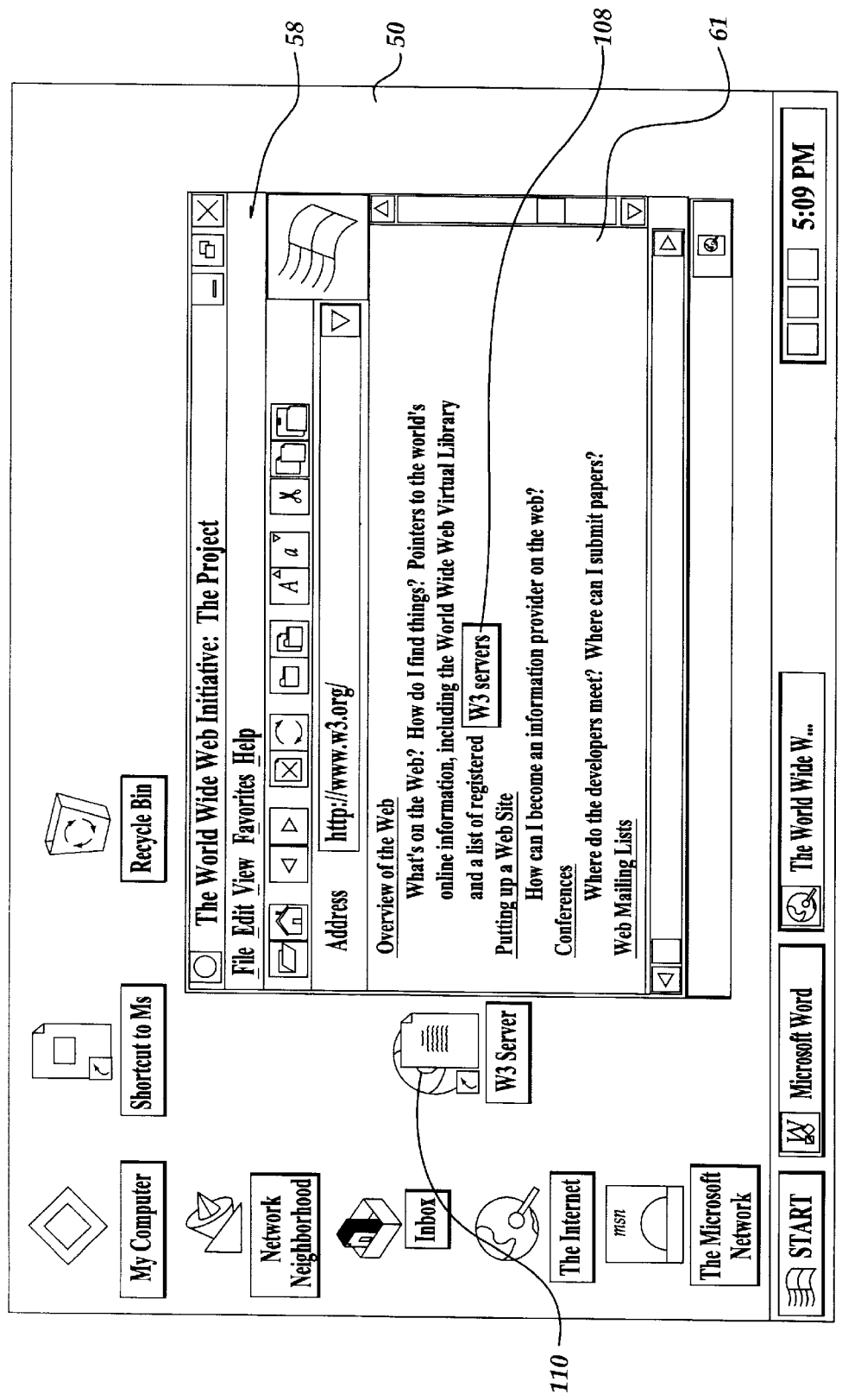
FIG. 11B illustrates an Internet shortcut that is created by dragging and dropping a hypertext link from an Internet document in accordance with the preferred embodiment of the present invention.

Documents that are set forth in the HTML (HyperText Markup Language) format include hyperlinks. These are links that may be used to gain access to related documents. These hyperlinks may be dragged and dropped to create Internet shortcuts. For example, as shown in FIG. 11A, the Internet document 61 includes a hyperlink 108 associated with the term "W3 servers." It should be appreciated that this hyperlink is surrounded by a broken border in FIG. 11A solely for illustrative purposes. A user may use the mouse 46 to position the mouse cursor over the hyperlink 108 and drag the hyperlink to a destination where the hyperlink is dropped. FIG. 11B illustrates an example of the appearance of the virtual desktop when the hyperlink 108 has been dragged and dropped onto the virtual desktop 50 to create an Internet shortcut 110.

Figure 12:
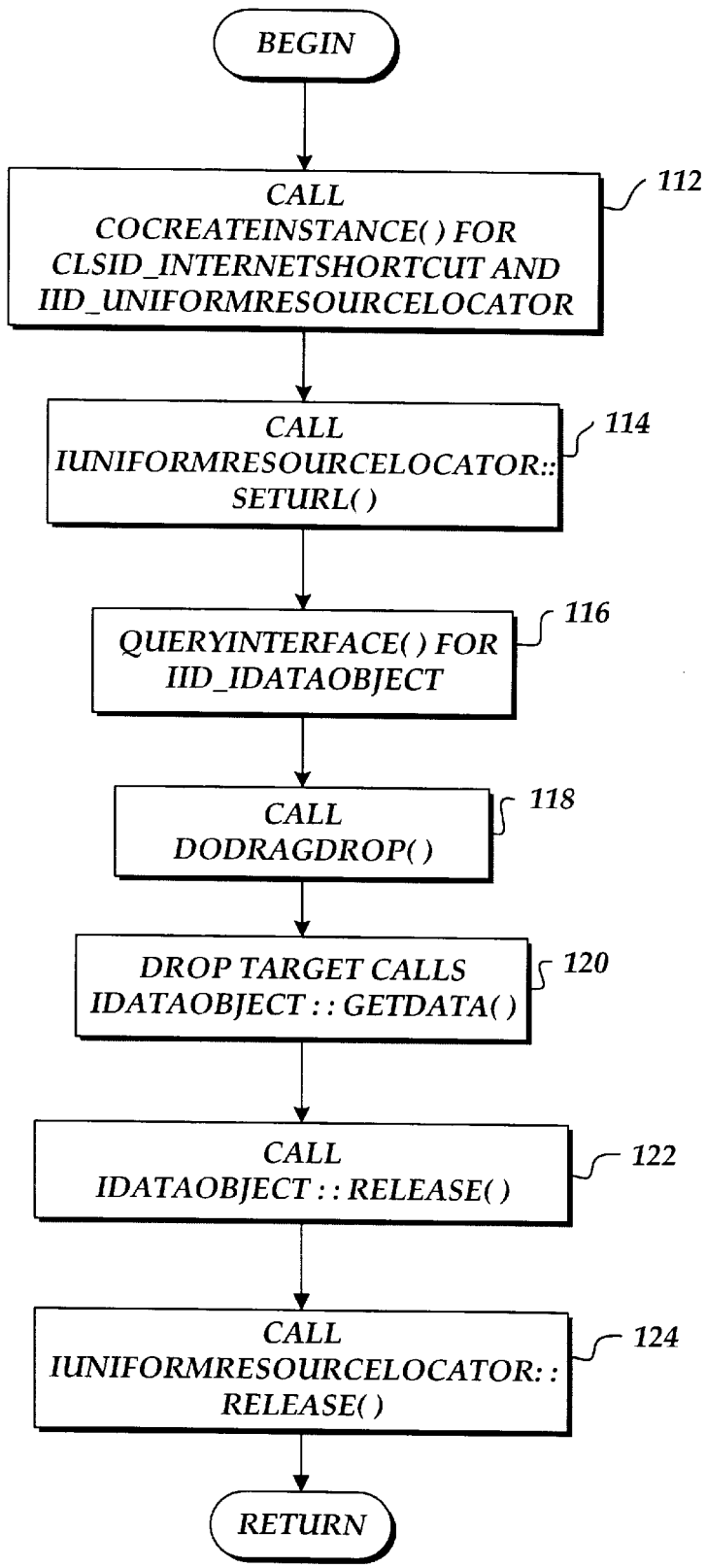
FIG. 12 is a flowchart illustrating the programmatic steps that are performed when an Internet shortcut is created by dragging and dropping a hypertext link.

FIG. 12 illustrates the programmatic steps that are performed to create an Internet shortcut object when the drag and drop technique described above relative to FIGS. 11A and 11B is used. Initially, the CoCreateInstance( ) function is called to create an object of the Internet shortcut class and to retrieve an IUniformResourceLocator interface (step 112). The SetURL( ) function of the IUniformResourceLocator interface of the Internet shortcut object is called to set the URL for the Internet shortcut (step 114). The QueryInterface( ) function is then called to obtain an IDataObject interface for the Internet shortcut object (step 116). The DoDragDrop( ) function is called to perform the drag and drop operation with that IDataObject (step 118). The drop target calls the GetData( ) function within the IDataObject interface to obtain data for the Internet shortcut (step 120). It should be appreciated that other methods within the IDataObject interface may also be called to retrieve data. The Release( ) function in the IDataObject interface is called to release the IDataObject interface (step 122). Similarly, the Release( ) function of the IUniformResourceLocator interface is called to release the IUniformResourceLocator interface (step 124).

Figure 13:
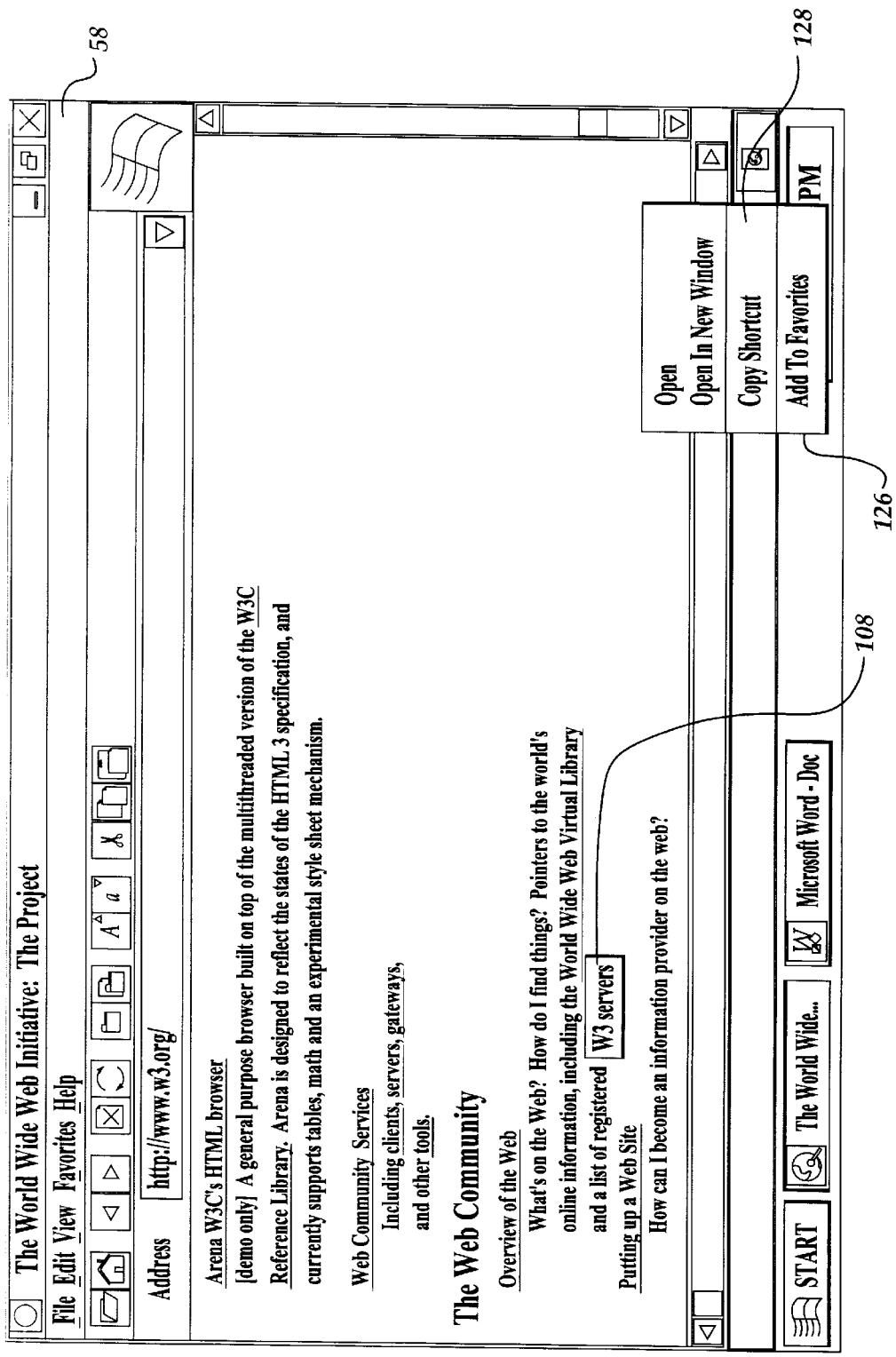
FIG. 13 depicts a context menu for a hypertext link.

An Internet shortcut may additionally be created from the context menu of a hyperlink. FIG. 13 shows an example of a context menu 126 that may be produced from the hyperlink 108 by clicking a right button of the mouse 46 while a mouse cursor is positioned over the hyperlink. The context menu 126 includes a "Copy Shortcut" menu option 128 that causes an Internet shortcut to the hyperlink to be copied to the clipboard. The user may then paste the Internet shortcut at desired destination.

Figure 14:
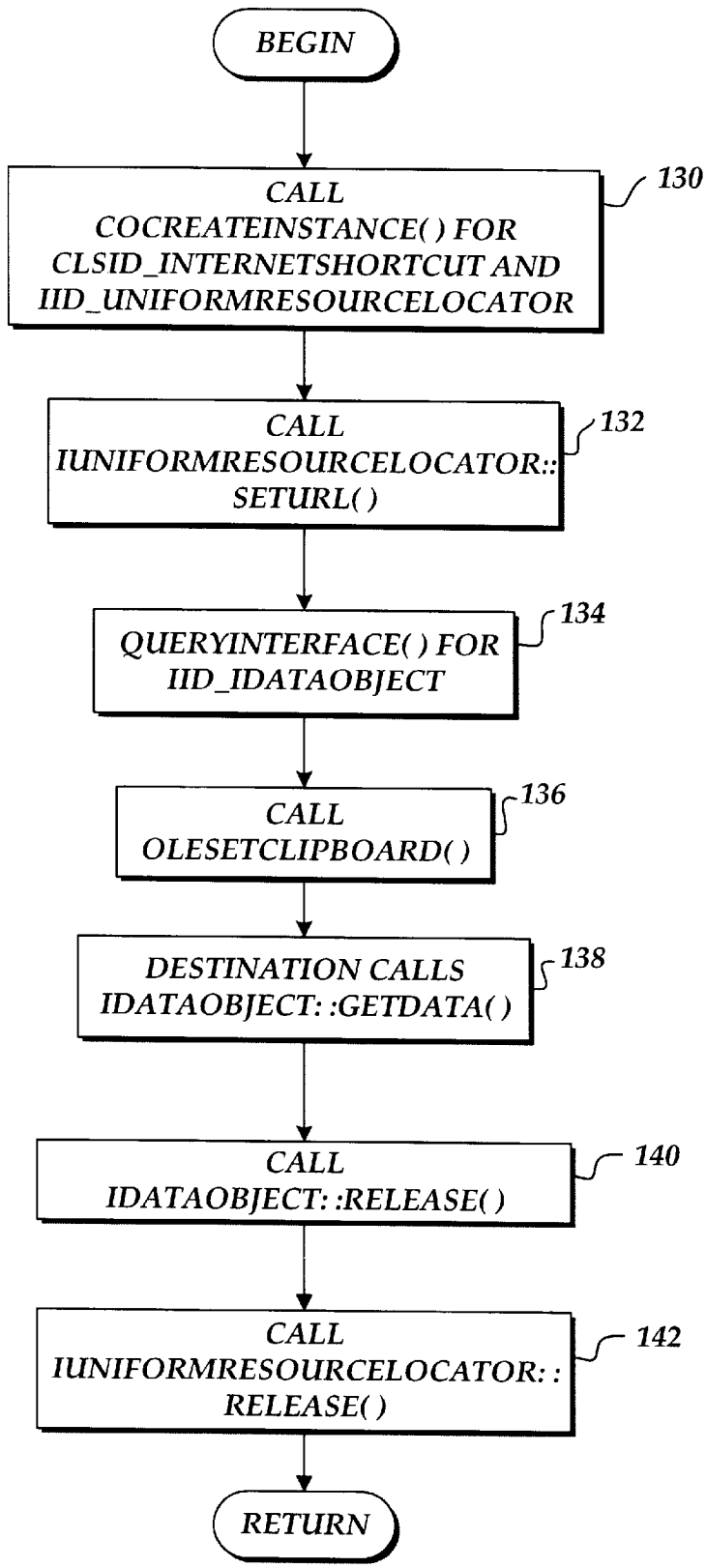
FIG. 14 is a flowchart illustrating the programmatic steps that are performed when an Internet shortcut is created using the context menu of a hypertext link.

FIG. 14 is a flowchart that illustrates the programmatic steps that are performed when the Internet shortcut is created using the context menu for a hyperlink. Initially, the CoCreateInstance( ) function is called to create an object of the Internet shortcut class and to return an IUniformResourceLocator interface (step 130). The SetURL( ) function within the IUniformResourceLocator interface of the Internet shortcut object is called to set the URL to the appropriate value (step 132). The QueryInterface( ) function is called to obtain an IDataObject interface that is supported by the Internet shortcut object (step 134). The OleSetClipboard( )

function provided by "Microsoft" OLE 2.01 is called to put the Internet shortcut on the clipboard (step 136). When the paste operation occurs, the GetData( ) function of the IDataObject interface is called (step 138). The Release( ) function of the IDataObject interface is called to release the IDataObject interface (step 140). Lastly, the Release( ) function of the IUniformResourceLocator interface is called to release that interface (step 142).

Figure 15:
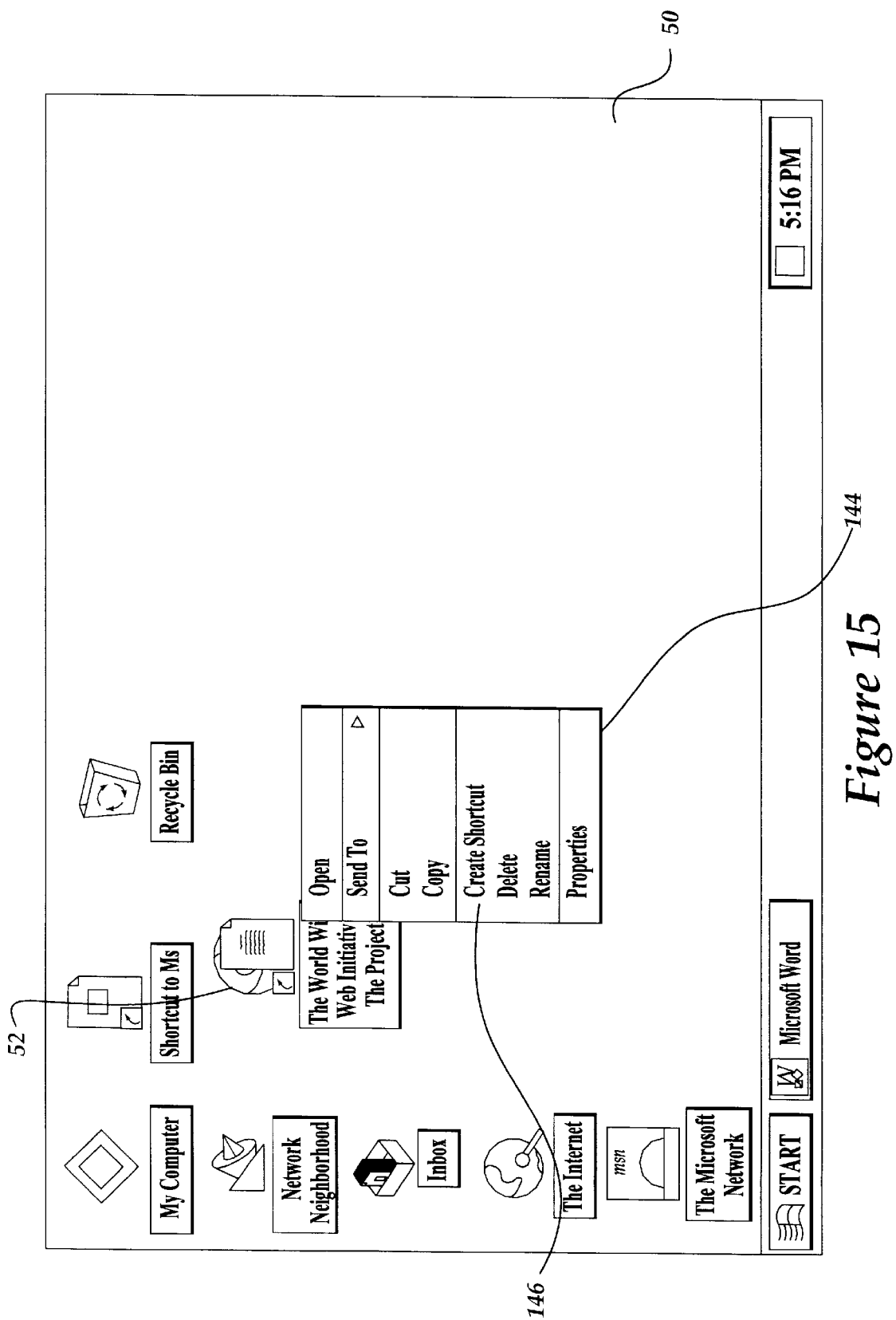
FIG. 15 illustrates a context menu for an Internet shortcut.

An Internet shortcut may also be created from an existing Internet shortcut. In particular, a copy of an Internet shortcut may be created from a context menu of an existing shortcut. FIG. 15 depicts an example of a context menu 144 for Internet shortcut 52. The context menu 144 may be displayed by clicking the right button of the mouse 46 when the mouse cursor points to the Internet shortcut 52. The context menu 144 includes a "Create Shortcut" menu option 146 for creating an Internet shortcut. Programmatically, the Explorer simply copies the existing Internet shortcut to a new file to create the new Internet shortcut.

Figure 16A:
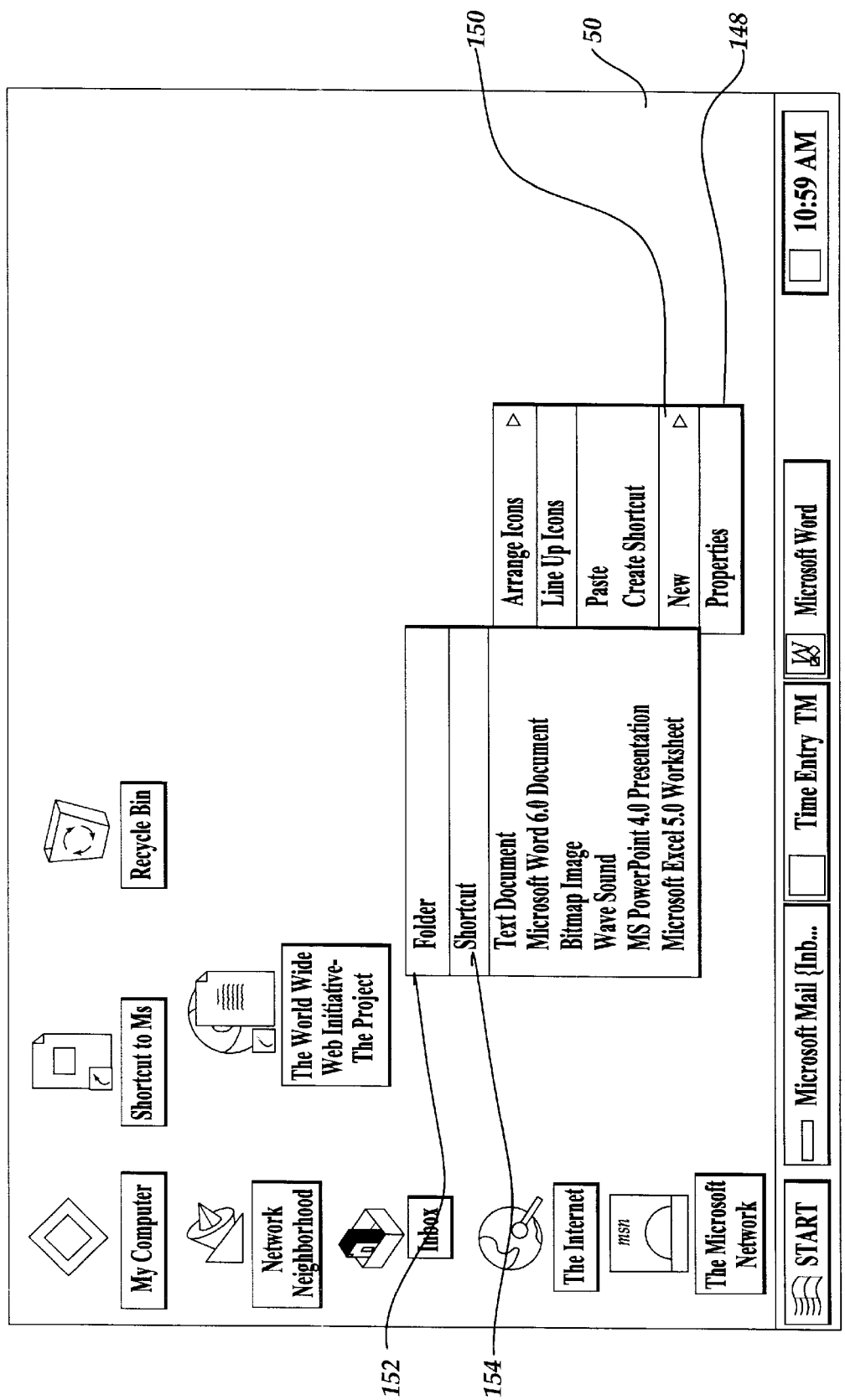
FIG. 16A illustrates a desktop context menu and associated cascading "New" menu.
Figure 16B:
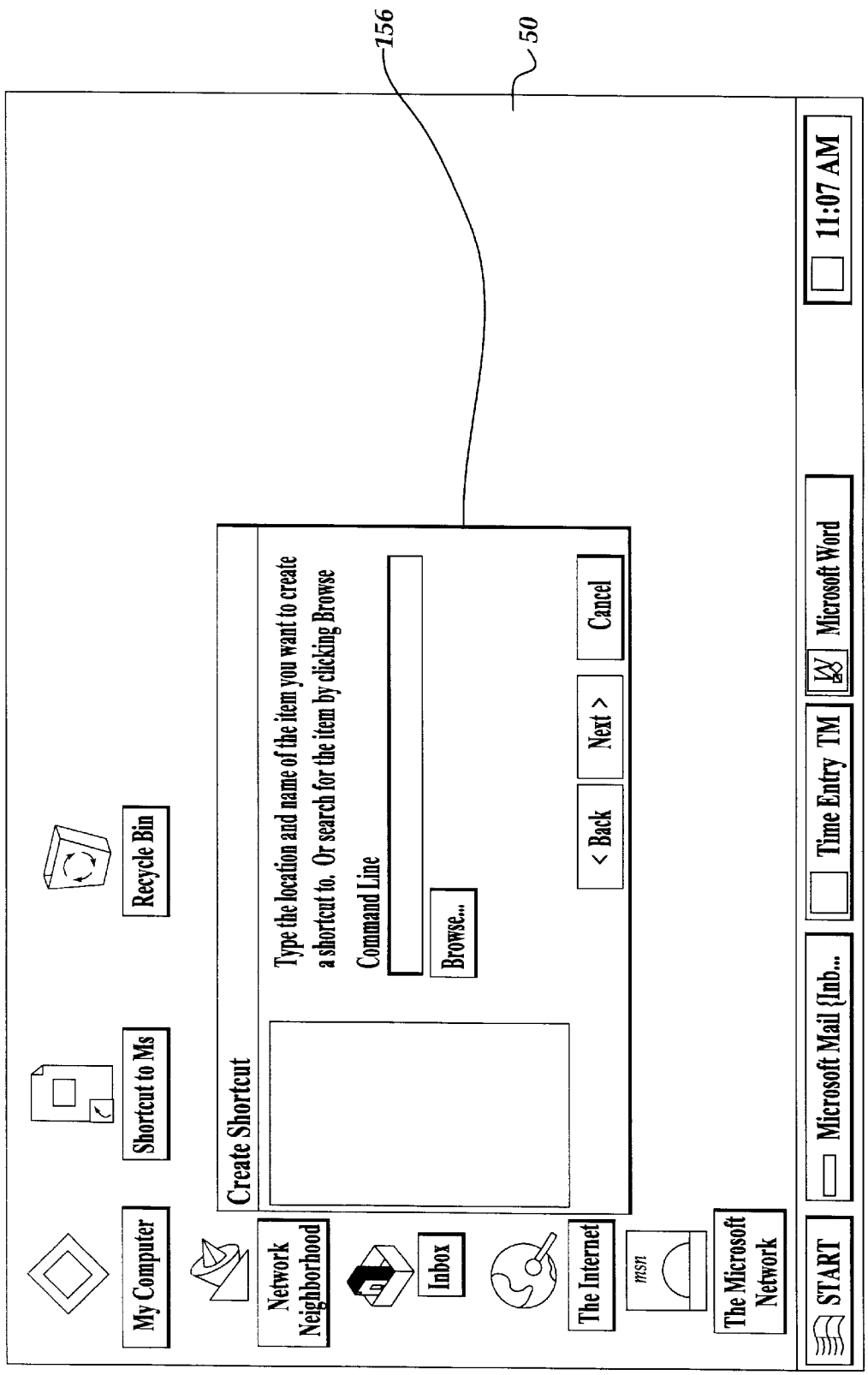
FIG. 16B illustrates the first sheet in a "Create Shortcut" wizard.

An Internet shortcut may, likewise, be created from the virtual desktop 50 or from any file system container. Specifically, a user may position the mouse cursor to point at a location on the virtual desktop 50 or other file system container window 10 and click a right button of the mouse 46. This causes a context menu 148 (FIG. 16A) to be displayed. The context menu 148 includes a "New" menu option 150. The "New" menu option 150 has a cascading menu 152 that is displayed when the mouse cursor is positioned over the "New" menu option. The cascading menu 152 includes a menu option 154 for creating a shortcut. When the user selects the "shortcut" menu option 154, a shortcut wizard 156 (like that shown in FIG. 16B) is displayed. The user may use the shortcut wizard to create a number of different types of shortcuts, including Internet shortcuts. The preferred embodiment of the present invention embellishes the code provide in the operating system 36 to facilitate the creation of Internet shortcuts.

In order to appreciate the programmatic steps that are performed to create an Internet shortcut using the Internet shortcut wizard, it is helpful to first review a new interface that is defined by the preferred embodiment of the present invention. This new interface is the INewShortcutHook interface. This interface includes functions that enable the user to create an Internet shortcut from a full or partial URL using the shortcut wizard. The INewShortcutHook interface includes several functions. The SetReferent( ) function sets the referent for the Internet shortcut (where the referent is a URL or other indication of location). The GetReferent( ) function gets the referent for the shortcut. The SetFolder( ) function sets the folder that contains the Internet shortcut, whereas the GetFolder( ) function gets the folder that contains the Internet shortcut. The GetName( ) function gets the name of the Internet shortcut within the containing folder and the GetExtension( ) function retrieves the extension for the Internet shortcut.

Figure 17:
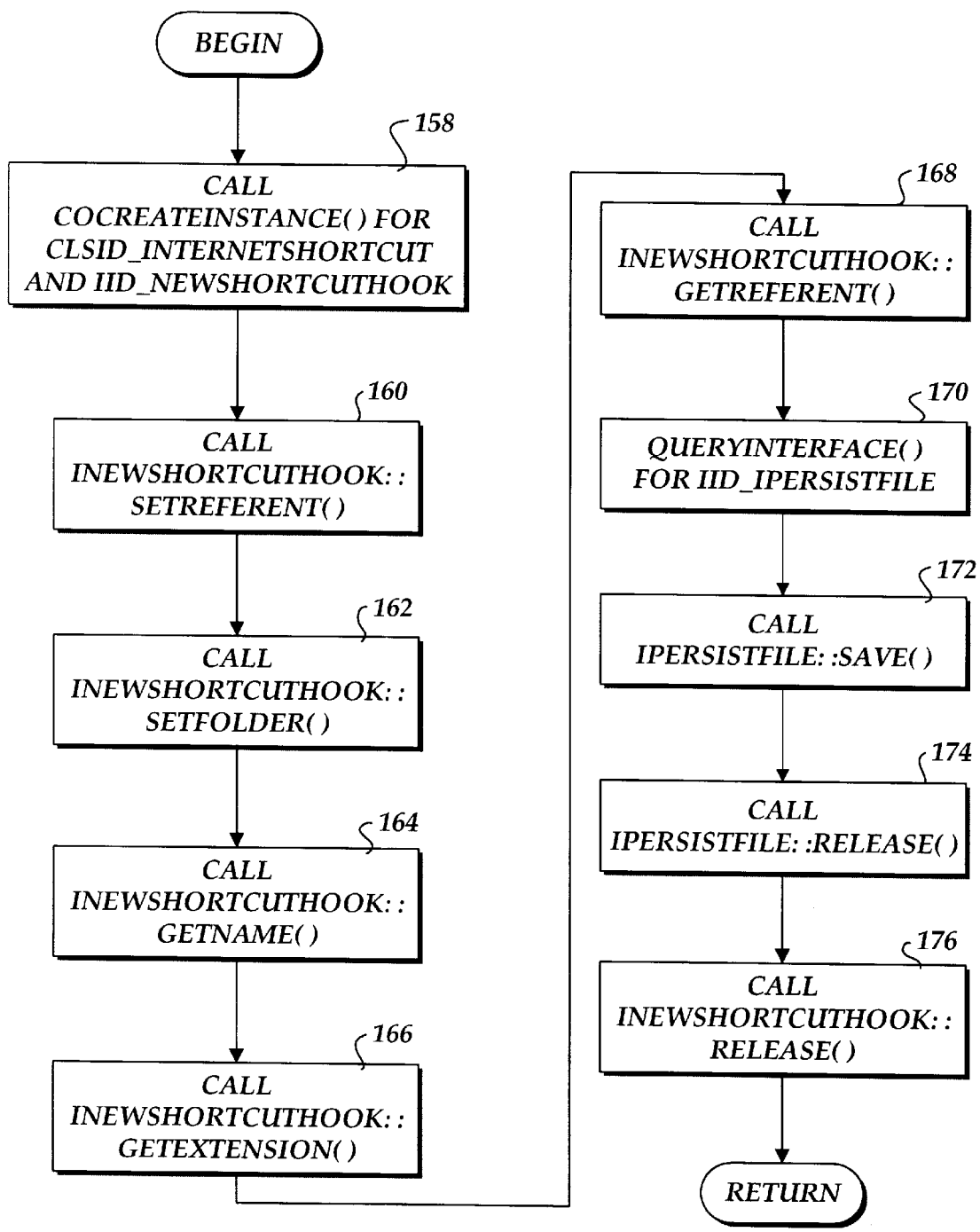
FIG. 17 is a flowchart illustrating the programmatic steps that are preferred to create an Internet shortcut from a context menu of a file system container.

FIG. 17 illustrates the programmatic steps that are performed to create an Internet shortcut using the Internet shortcut wizard. Initially, the CoCreateInstance( ) function is called to create an instance of an object of the Internet shortcut class and to return an INewShortcutHook interface (step 158). The SetReferent( ) function within the INewShortCutHook interface is called to set the appropriate referent for the Internet shortcut object (step 160). The SetFolder( ) function within the INewShortcutHook interface is called to set the folder that contains the Internet shortcut (step 162). Next, the GetName( ) function of the INewShortcutHook interface is called to obtain a suggested file name for the Internet shortcut (step 164). The GetExtension( ) function of the INewShortcutHook interface is then called to get the .url extension for the Internet shortcut (step 166). The GetReferent( ) function is called to obtain the referent for the Internet shortcut object (step 168).

A QueryInterface( ) call is then made to retrieve the IPersistFile interface for the Internet shortcut object (step 170). The Save( ) function within the IPersistFile interface is called to save the Internet shortcut as a .url file (step 172). The Release( ) function of IPeristFile is called to release the IPersistFile interface (step 174). Lastly, the Release( ) function of the INewShortcutHook interface is called to release that interface (step 176).

It should be appreciated that the operating system 36 and/or the Internet shortcut extension handler may define certain Internet shortcuts a priori that do not require the user to explicitly create them.

Figure 18:
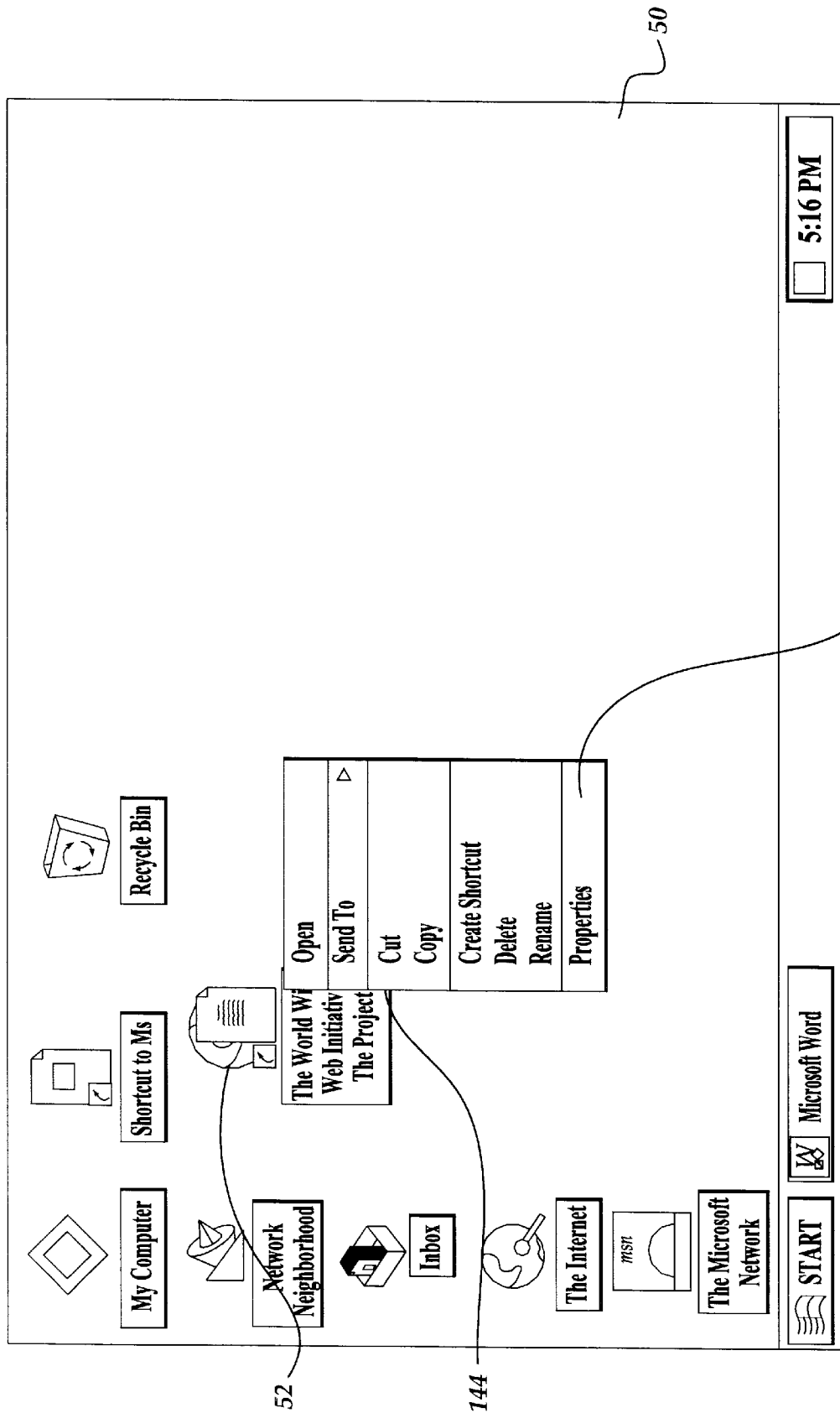
FIG. 18 illustrates a context menu for an Internet shortcut.
Figure 19:
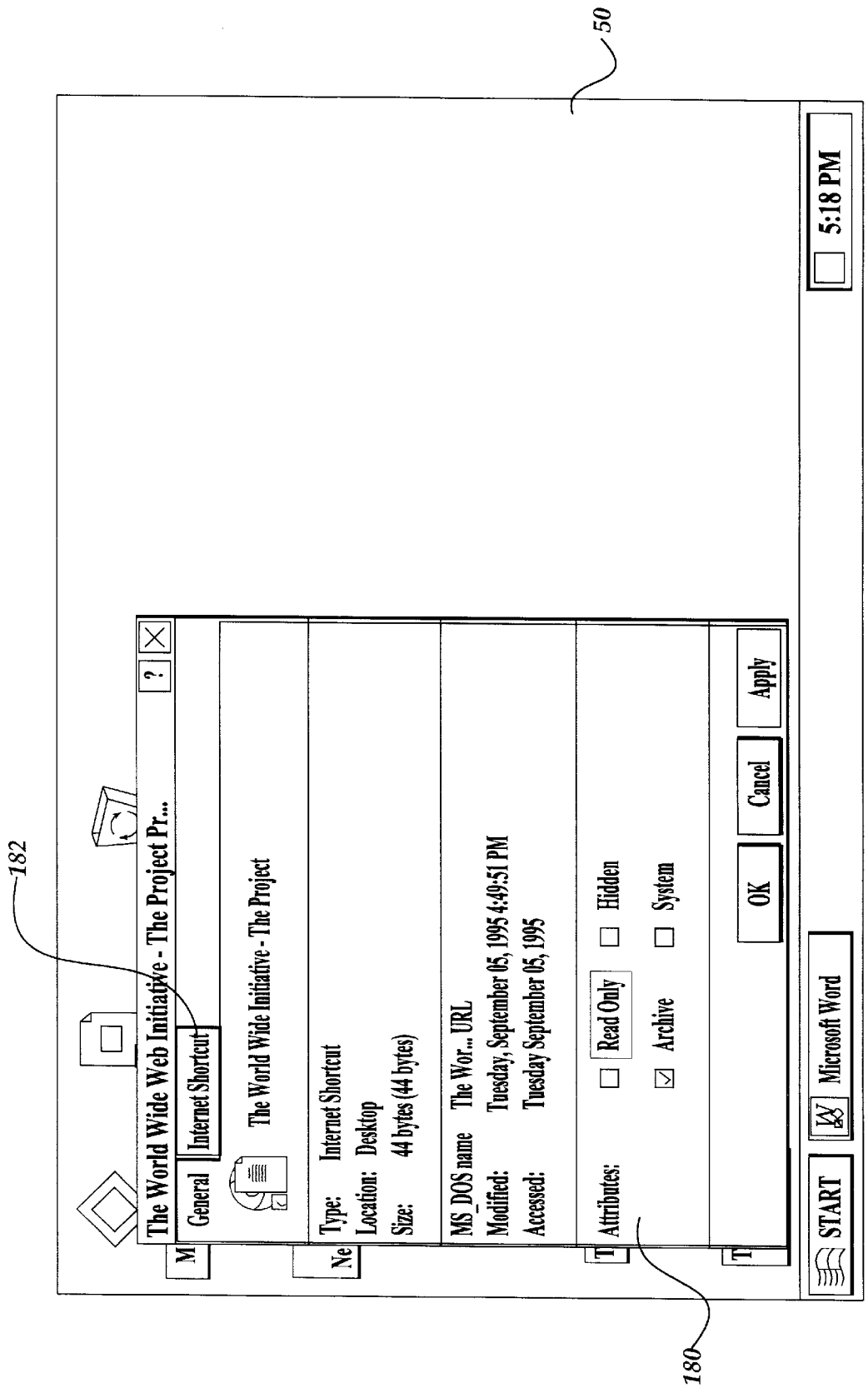
FIG. 19 illustrates a "General" properties sheet for an Internet shortcut.
Figure 20:
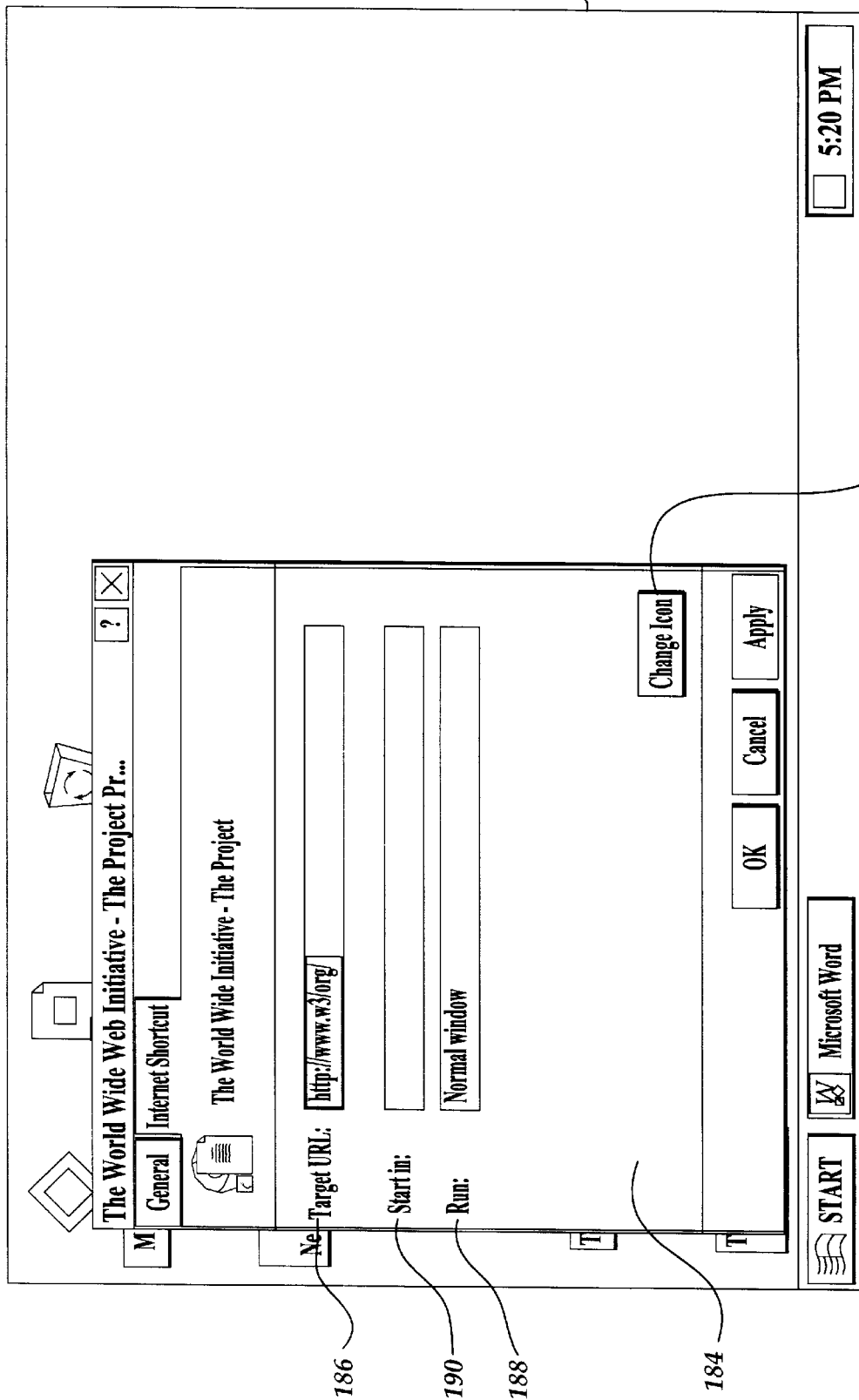
FIG. 20 illustrates a "Internet Shortcut" properties sheet for an Internet shortcut.

Each Internet shortcut object has a number of properties associated with it that may be viewed and edited through property sheets. To display a property sheet for an Internet shortcut, a user may click the fight button of mouse 46 while the mouse cursor points to Internet shortcut 52. As was described above relative to FIG. 15, such user action causes the context menu 144 to be displayed. This context menu 144, includes a "Properties" menu option 178 as shown in FIG. 18. When the user selects the "Properties" menu option 178, a property sheet 180 (FIG. 19) is displayed. The "General" property sheet 180 specifies general information about the Internet shortcut. The user may also position the mouse cursor to point at tab 182 and click a left mouse button on mouse 46 to display an "Internet Shortcut" property sheet 184 (FIG. 20). The "Internet Shortcut" property sheet 184 includes a text box 186 for viewing and editing the URL that is associated with the shortcut. The "Internet Shortcut" property sheet 184 additionally includes a "Run" drop down list 188 that allows a user to specify the start state of the window when the associated application for displaying the Internet document is run. A user may specify the start state as minimized, normal or maximized through the "Run" drop down list 188. A Text box 190 allows a user to specify what directory to start in when the associated application is run. Lastly, a "Change Icon . . . " button 192 is provided to allow a user to change the icon that is associated with the Internet shortcut. These property sheets are implemented as property sheet extensions as described in the copending application entitled "Shell Extensions for an Operating System," U.S. patent application Ser. No. 08/355,410, now U.S. Pat. No. 5,831,606. The property sheet handler is provided by URL.DLL.

The .url files have a predefined format. Each .url file may include a URL and other information such as working directory, icon file, icon index and hot key. An example of a contents of a url file for an Internet shortcut is as follows:

[InternetShortcut]

URL=http://www.unitedmedia.com/comics/dilbert/archive/dilbert950826.gif

Hotkey=1604

WorkingDirectory=d:\temp

ShowCommand=3

IconFile=C:\WfNDOWS\system\shell32.dl1

IconIndex=21

Figure 21A:
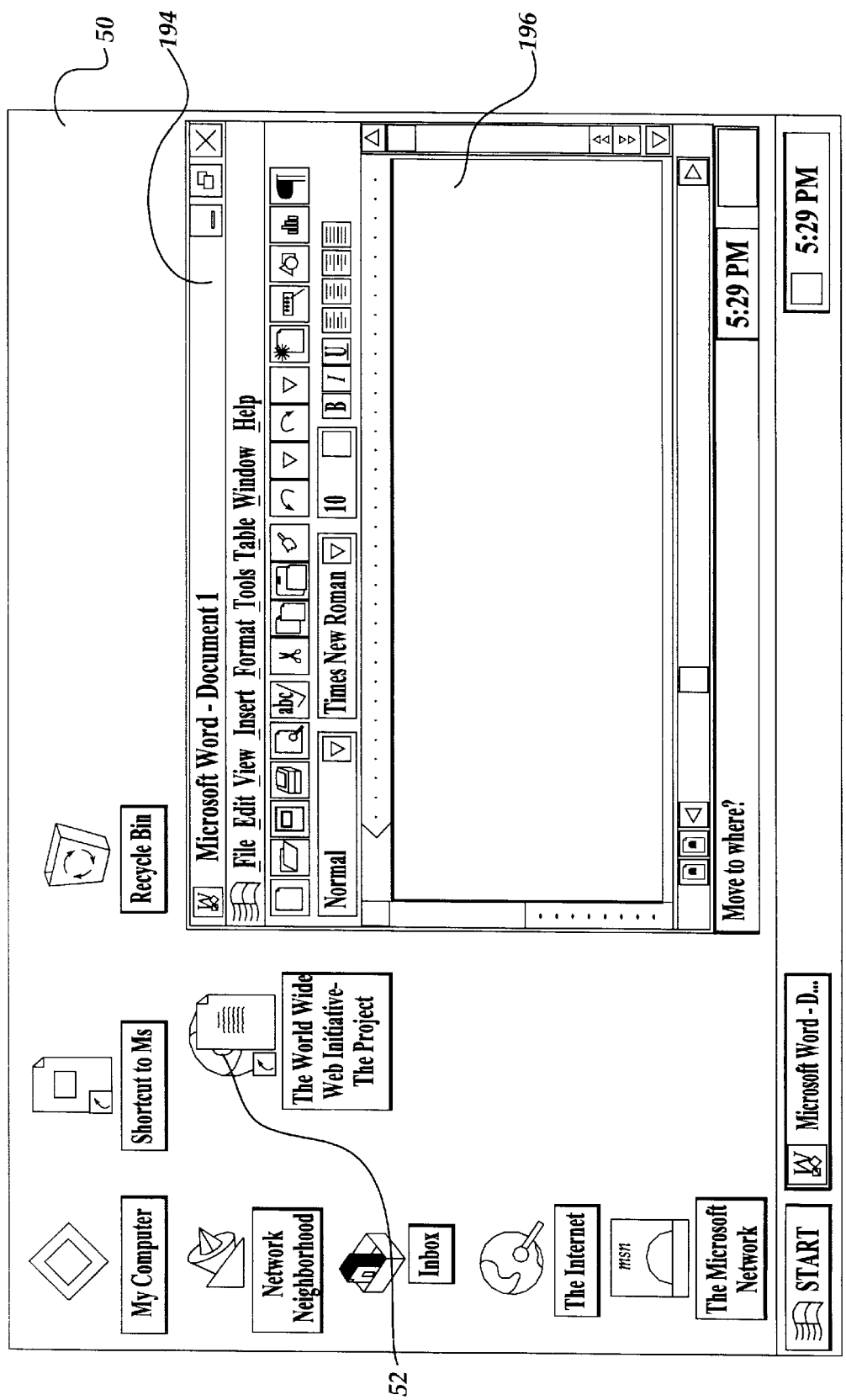
FIGS. 21A and 21B illustrate how an Internet shortcut may be dragged and dropped to embed it in a new location.
Figure 21B:
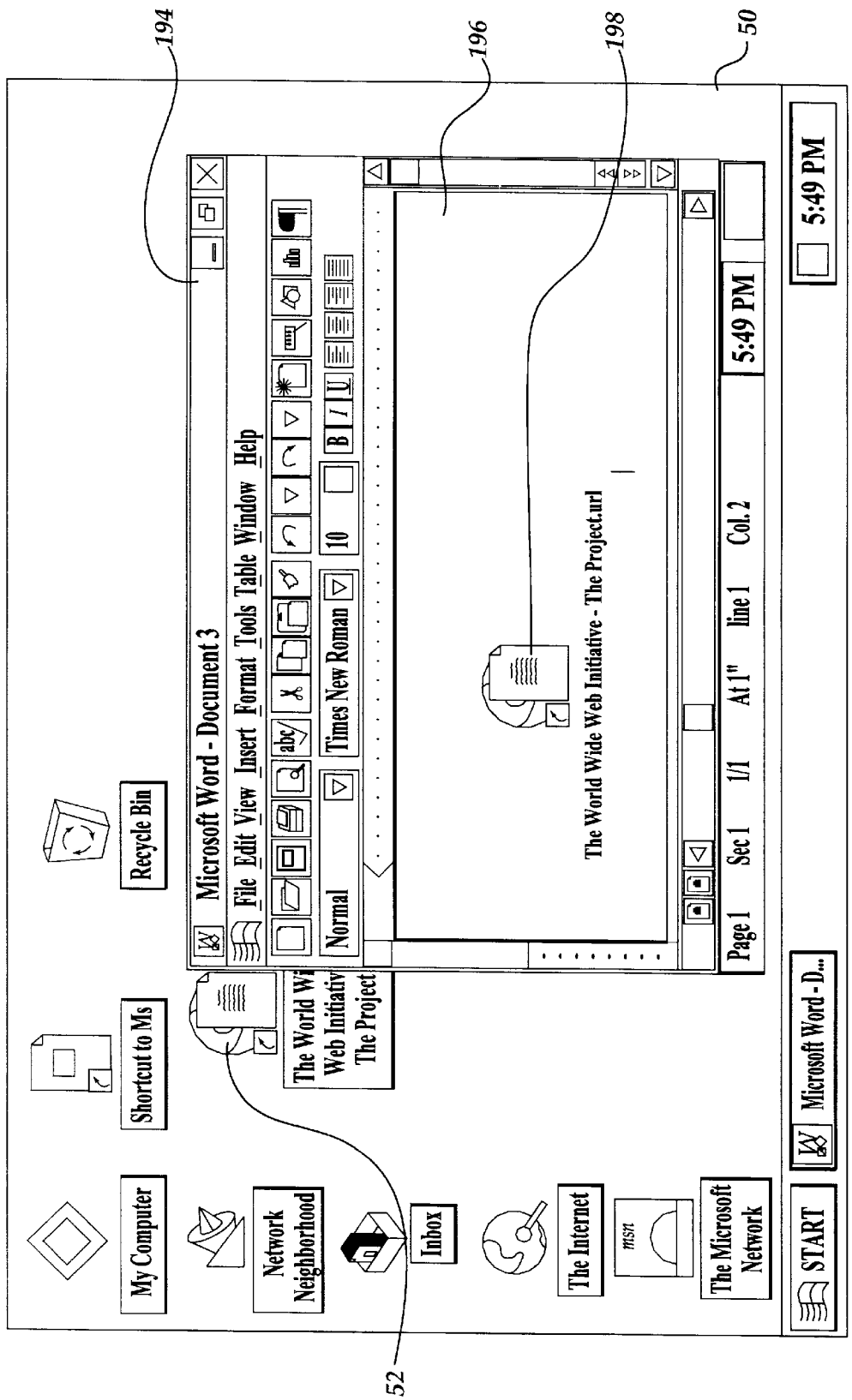

As mentioned above, Internet shortcuts may be dragged and dropped. The Internet shortcuts utilize the "Microsoft" OLE 2.01 mechanism described in copending application "Uniform Data Transfer," U.S. patent application Ser. No. 08/199,853, filed on Feb. 22, 1994, which is now abandoned, explicitly incorporated by reference herein. FIGS. 21A and 21B illustrate an example of how this drag and drop capability may be utilized. Suppose that a user has a word processing window 194 open with an open document 196. If the user drags Internet shortcut icon 52 and drops the Internet shortcut icon in the document 196, the Internet shortcut becomes embedded within the document. A corresponding Internet shortcut icon 198 is displayed within the document 196. The drop behavior that is exhibited is a product of the drop target as established by the "Microsoft" OLE 2.01 protocol.

Because Internet shortcuts are objects that are visible in the name space, they may be treated like other objects in the name space. Accordingly, the Internet shortcut icons may be transferred in a fashion like other objects. One way in which these Internet shortcuts may be transferred is through the context menu 144. The context menu includes a "Send To" menu option 200 (FIG. 22) that has an associated cascading menu 202 that lists the number of possible destinations. These destinations include floppy disk, facsimile recipients and e-mail recipients.

Figure 22:
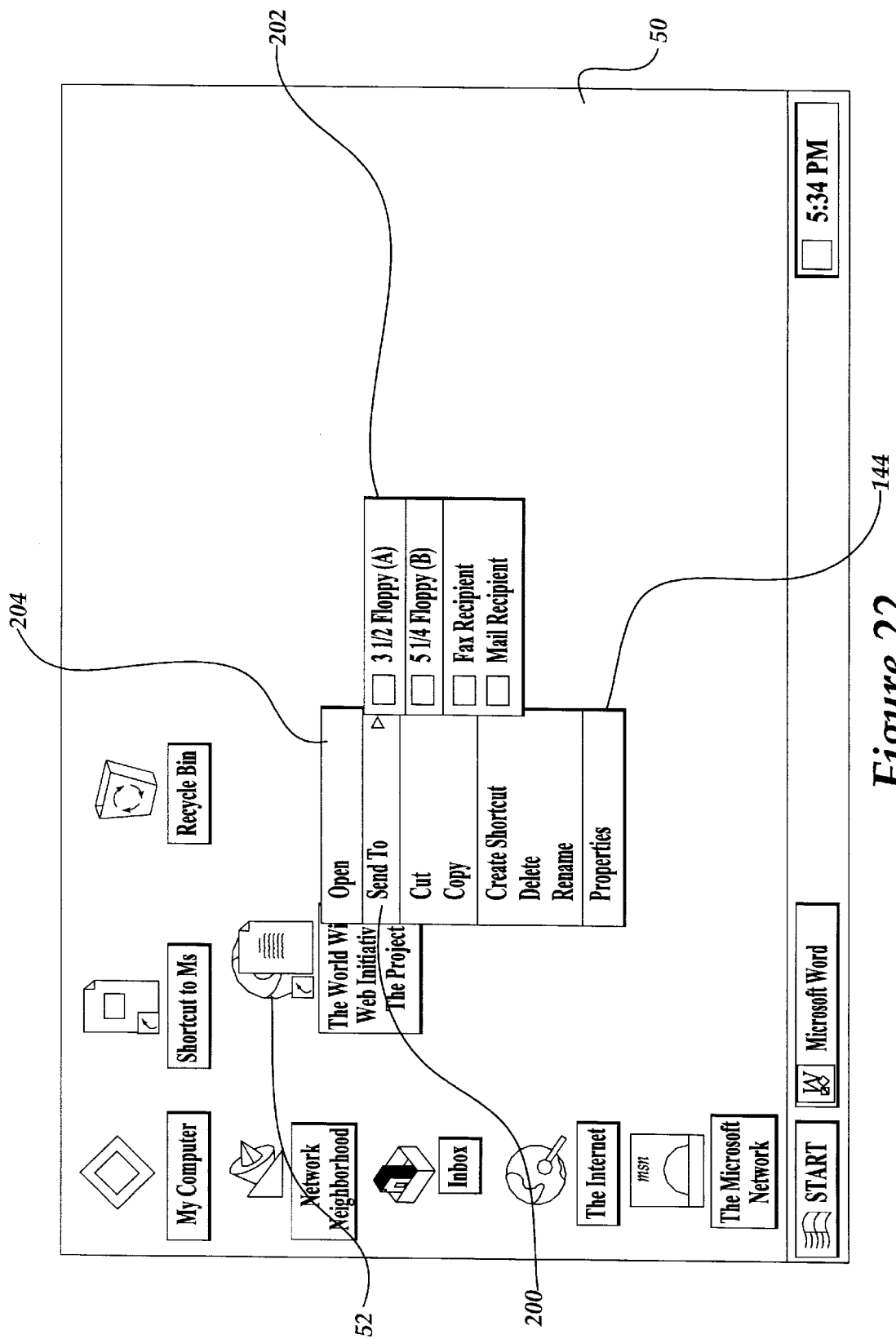
FIG. 22 illustrates a context menu and cascading "Send To" menu for an Internet shortcut.
Figure 23:
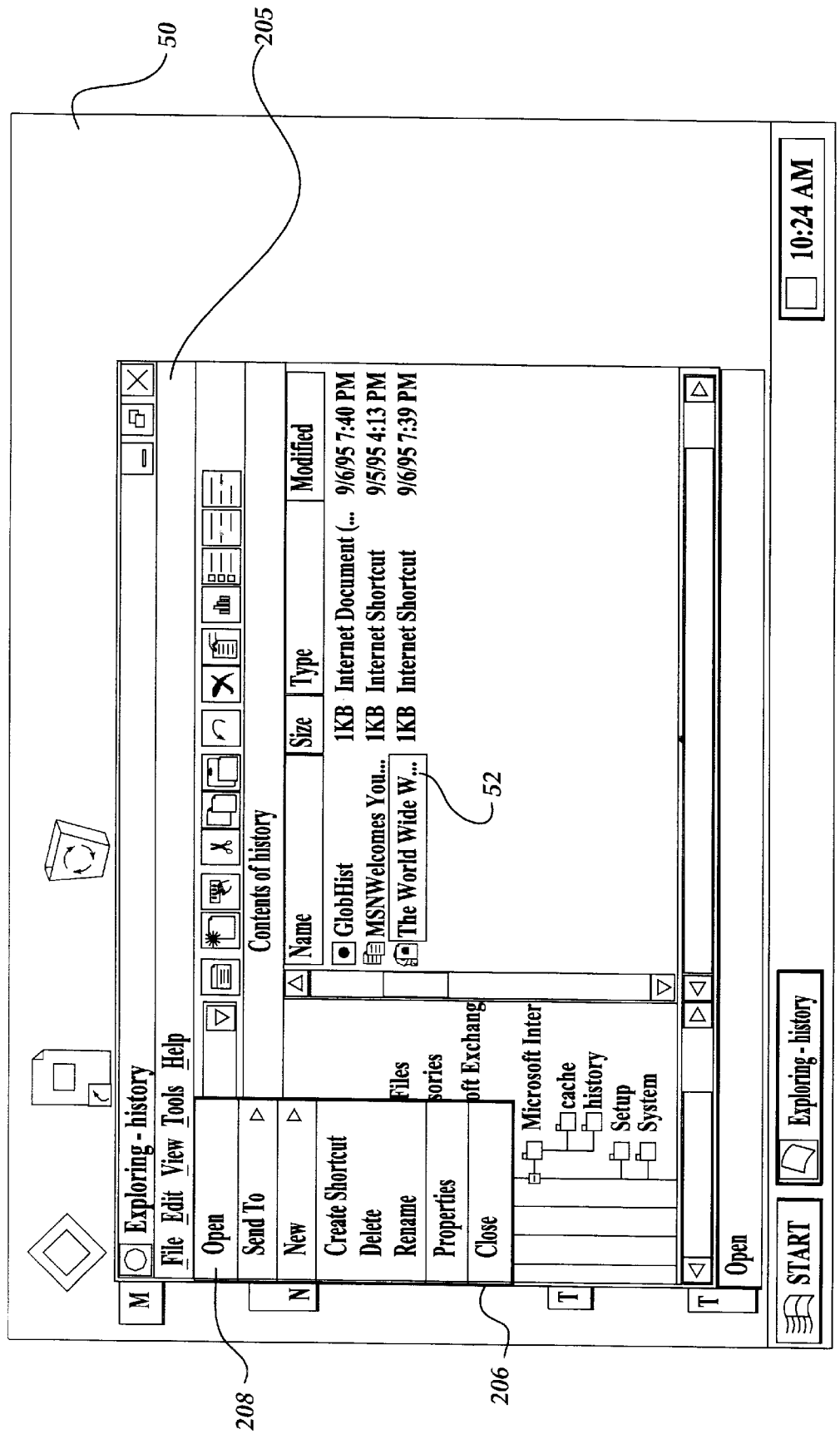
FIG. 23 illustrates a "File" menu for an explorer application that may be used to open an Internet shortcut.

A user may open an Internet shortcut in a number of different ways. A first option is for the user to select an open menu option 204 from the context menu 144 for the Internet shortcut 52 (FIG. 22). A second option is for a user to position a mouse cursor over the Internet shortcut icon 52 and double click the designated button of the mouse 46. An Internet shortcut may also be opened in an explorer application 205 (FIG. 23). In particular, a user may open a file menu 206 and select an "Open" menu option 208.

Figure 24:
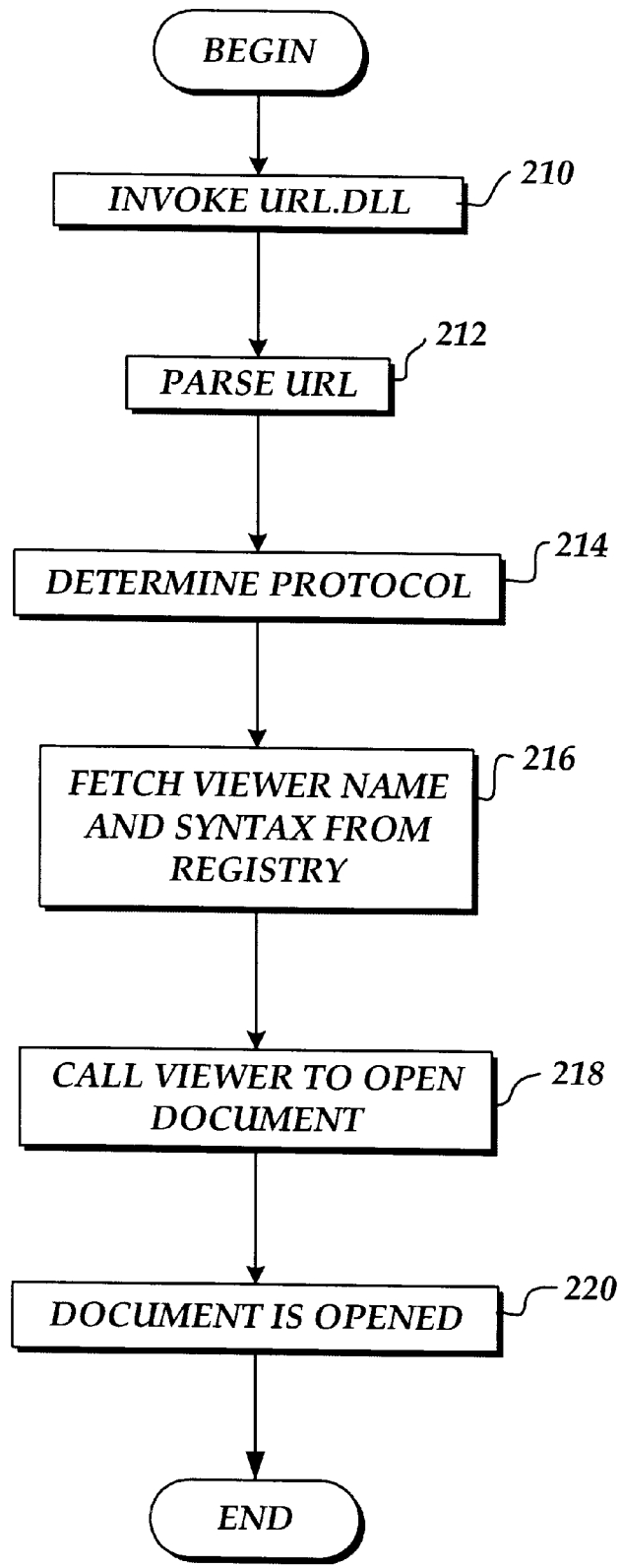
FIG. 24 is a flowchart illustrating the steps that are performed to open a document that is associated with an Internet shortcut.

All of the above described approaches for opening an Internet shortcut cause the steps in FIG. 24 to be performed. Initially, the Internet shortcut extension handier (URL.DLL) is invoked (step 210). The Internet shortcut extension handler retrieves the URL from the Internet shortcut object and parses the URL (step 212). The Internet shortcut extension handier then determines the protocol for the URL from the parsed URL (step 214). Using the protocol identification information that has been determined from the parsed URL, the Internet shortcut extension handler looks to the registry to fetch the client program for the protocol handler name (based on protocol) and syntax for passing the URL argument (step 216). The Internet shortcut extension handler then calls the client program using the determined syntax to request opening of the associated document (step 218). The document is then opened by the Internet viewer (step 220). The Internet viewer includes the appropriate intelligence for using the URL to locate the corresponding document.

In order to support activation of the corresponding Internet document from an Internet shortcut, the preferred embodiment of the present invention defines the IShallExecuteHook interface that is supported by the Interface shortcut objects. The IShallExecuteHook interface is used to allow a full or partial URL to be programmatically activated by calling the ShallExecute( ) API in the operating system 36. The interface supports a single function :Execute( ). The Execute method executes a given argument, such as a URL.

While the present invention has been described with reference to a preferred embodiment thereof, those skilled in the art will appreciate that various changes in form or detail may be made without departing from the intended scope of the invention as defined in the appended claims. For example, the present invention may be used to encapsulate other kinds of location information that differ from URLs.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing a shortcut object that is associated with a resource, comprising:
   (a) selecting the resource for association with the shortcut object;
   (b) creating the shortcut object in a name space provided by an operating system, the shortcut object including a locator for the resource; and
   (c) when the shortcut object is selected, automatically launching a browser to find the resource, the locator included with the shortcut object being employed to identify a location of the resource so that the resource can be accessed with the browser.

2. The method of claim 1, wherein the selection of the resource for association with the resource, further comprises dragging a link associated with the resource onto a virtual desktop from a window displayed on the virtual desktop.

3. The method of claim 2, wherein the inclusion of the locator for the resource with the shortcut object, further comprises dropping the dragged link onto the virtual desktop, the shortcut object being created in the name space provided by the operating system when the dragged link is dropped on the virtual desktop.

4. The method of claim 1, wherein the creation of the shortcut object, further comprises selecting an item in a list, the selection of the item causing the creation of the shortcut object and the locator to be included with the shortcut object.

5. The method of claim 4, wherein the list is provided in a context menu associated with a hyperlink that is associated with the resource.

6. The method of claim 4, wherein the list is provided in a context menu for a file system container that is associated with the resource.

7. The method of claim 4, wherein the list is provided in a context menu associated with a wizard facility for creating the shortcut object.

8. The method of claim 4, wherein the list is provided in a context menu associated with the virtual desktop.

9. The method of claim 1, further comprising:
   (a) selecting the shortcut object;
   (b) copying the shortcut object to create another shortcut object in the name space of the operating system, the other shortcut object including a copy of the locator included with the shortcut object; and
   (c) storing the other shortcut object in the name space of the operating system.

10. The method of claim 1, wherein creating the shortcut object that includes the locator for the resource; further comprising:
    (a) creating the shortcut object in the name space of the operating system;
    (b) setting the value of the locator, the locator being included with the shortcut object; and
    (c) storing the shortcut object that includes the locator in the name space of the operating system, the shortcut object being displayable in the name space of the operating system.

11. The method of claim 1, further comprises selecting the display of at least one property associated with the shortcut object.

12. The method of claim 11, wherein the display of a property associated with the shortcut object includes type, location, size, attribute, time stamp, and MS-DOS name.

13. The method of claim 12, wherein the displayed property is presented in a context menu associated with the shortcut object.

14. The method of claim 1, wherein automatically employing the locator included with the shortcut object to find the location of the resource, further comprising:

(a) retrieving the locator from the shortcut object with a first program module;

(b) calling a second program module to request the opening of a document associated with the resource; and (c) employing a third program module to locate and open the document associated with the resource.

15. The method of claim 14, wherein the second program module is called by the first program module.

16. The method of claim 14, wherein the third program module is called by the first program module.

17. The method of claim 14, wherein the first program module is a shortcut extension handler in the operating system.

18. The method of claim 14, wherein the second program module is a protocol handler that provides support for at least one of a plurality of protocols, the plurality of protocols including a Hyper Text Transfer Protocol (HTTP) and a File Transfer Protocol (FTP).

19. The method of claim 14, wherein the third program module is a viewer program, the viewer program including the browser program and a service included with the operating system.

20. The method of claim 1, wherein the locator is a uniform resource locator (URL).

21. The method of claim 1, wherein the resource is located on a network.

22. The method of claim 1, wherein the shortcut object is stored in the name space provided by the operating system, the shortcut object being displayed in the name space of the operating system.

23. The method of claim 1, further comprising a visual representation associated with the shortcut object, the visual representation providing an indication of the association with the shortcut object.

24. The method of claim 23, wherein the visual representation includes icon, picture and graphic.

25. The method of claim 1, wherein creating the shortcut object in the name space, further comprising editing information associated with the resource.

26. The method of claim 25, wherein the information associated with the resource includes the locator, path for the resource, display window size for the resource and an icon associated with the shortcut object.

27. Computer-readable medium having computer-executable instructions for performing the steps recited in any one of claims 1–4, 9–10 or 14.

28. Method for creating a shortcut object associated with a resource on a network, the shortcut object enabling access to the resource on the network, comprising:

(a) identifying an address on the network corresponding to the resource;

(b) generating the shortcut object, the shortcut object encapsulating the address for the resource and being identified as associated with the resource;

(c) storing the shortcut object in a name space provided by an operating system, the shortcut object in the name space being displayable; and (d) automatically activating a browser to locate and access the resource when the shortcut object is selected.

29. A system for providing a shortcut object that is associated with a resource, comprising:

(a) a display for displaying the shortcut object;

(b) a memory for storing logical instructions; and (c) a processor for implementing the logical instructions, including:

(i) selecting the resource for association with the shortcut object;

(ii) creating the shortcut object in a name space provided by an operating system, the shortcut object including a locator for the resource; and (iii) when the shortcut object is selected, automatically activating a browser to find the resource, the locator included with the shortcut object being employed to identify a location of the resource so that the resource can be accessed with the browser.

* * * * *

UNITED STATES PATENT AND TRADEMARK OFFICE
CERTIFICATE OF CORRECTION

PATENT NO. : 6,091,409
DATED : July 18, 2000
INVENTOR(S) : D.R. Dickman et al.

Page 1 of 1

It is certified that error appears in the above-identified patent and that said Letters Patent is hereby corrected as shown below:

<u>Column 12,</u>
Line 16, "with the resource," should read -- with the shortcut object, --

Signed and Sealed this

Nineteenth Day of March, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,091,409
DATED         : July 18, 2000
INVENTOR(S)   : D.R. Dickman et al.

Page 1 of 2

It is certified that error appears in the above-identified patent and that said Letters Patent is hereby corrected as shown below:

Column 1,
Line 31, "handier" should read -- handler --

Column 2,
Line 21, "system" should read -- system. --
Line 60, "therein. and" should read -- therein and --

Column 3,
Line 44, "a "Add To Favorites. . ." button" should read -- an "Add To Favorites
. . . " button --

Column 4,
Line 13, "a "Internet Shortcut" properties" should read -- an "Internet Shortcut" properties --
Line 31, "by "Microsoft" Cor-" should read -- by Microsoft Cor- --

Column 7,
Line 15, "on menu" should read --on a menu --

Column 8,
Line 56, "desired destination." should read -- a desired destination. --

Column 9,
Line 36, "provide" should read -- provided --

Column 10,
Line 10, "of IPersistFile" should read -- of the IPersistFile --
Line 21, "fight" should read -- right --
Line 25, "144, includes" should read -- 144 includes --
Lines 48, "handier" should read -- handler --

Column 11,
Lines 32 and 36, "handier" should read -- handler --
Line 51, "Interface" should read -- Internet --

UNITED STATES PATENT AND TRADEMARK OFFICE
CERTIFICATE OF CORRECTION

PATENT NO. : 6,091,409
DATED : July 18, 2000
INVENTOR(S) : D.R. Dickman et al.

It is certified that error appears in the above-identified patent and that said Letters Patent is hereby corrected as shown below:

Column 12,
Line 49, "resource;" should read -- resource --
Line 50, "comprising:" should read -- comprises: --
Line 59, "comprises" should read -- comprising --

Column 13,
Line 3, "resource," should read -- resource --
Line 3, "comprising:" should read -- comprises: --

Column 14,
Line 2, "space," should read -- space --
Line 2, "comprising" should read -- comprises --

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,091,409
DATED         : July 18, 2000
INVENTOR(S)   : D.R. Dickman et al.

It is certified that error appears in the above-identified patent and that said Letters Patent is hereby corrected as shown below:

<u>Title page,</u>
Item [63], Related U.S. Application Data, "Continuation of application No. 08/526,314," should read -- Continuation of application No. 08/526,314, Feb. 12, 1998, which is a continued prosecution application of application No. 08/526,314, --
Item [57], ABSTRACT, "may created" should read -- may be created --; "web" should read -- Web --; "copy, delete, and copy" should read -- copy, delete, and cut --

<u>Column 3,</u>
Line 50, "folder," should read -- folder; --

<u>Column 5,</u>
Line 30, "5,831,606" should read -- 5,831,606, --

<u>Column 6,</u>
Line 5, "URL Protocol REG SZ"""" should read -- URL Protocol REG_SZ" " --
Line 45, "corner" should read -- corner --

<u>Column 7,</u>
Line 62, "CoCreateInstance(is" should read -- CoCreateInstance( ) is --

<u>Column 8,</u>
Line 4, "fuinction" should read -- function --
Lines 6 and 7, "Release ( )fuinction" should read -- Release ( ) function --

<u>Column 9,</u>
Line 24, "window 10" should read -- window --
Lines 61 and 62, "InewS-
        hortCutHook" should read -- INew-
                        ShortcutHook --

UNITED STATES PATENT AND TRADEMARK OFFICE
CERTIFICATE OF CORRECTION

PATENT NO. : 6,091,409
DATED : July 18, 2000
INVENTOR(S) : D.R. Dickman et al.

It is certified that error appears in the above-identified patent and that said Letters Patent is hereby corrected as shown below:

Column 10,
Line 61, ".d1l" should read -- .dll --

Column 13,
Line 24, "a viewer" should read -- the viewer --
Line 25, "the browser program" should read -- a browser program --

Signed and Sealed this

Seventh Day of September, 2004

JON W. DUDAS
*Director of the United States Patent and Trademark Office*